(12) United States Patent
Francon et al.

(10) Patent No.: US 11,783,195 B2
(45) Date of Patent: Oct. 10, 2023

(54) PROCESS AND SYSTEM INCLUDING AN OPTIMIZATION ENGINE WITH EVOLUTIONARY SURROGATE-ASSISTED PRESCRIPTIONS

(71) Applicant: Cognizant Technology Solutions U.S. Corporation, College Station, TX (US)

(72) Inventors: Olivier Francon, Sainte Foy les Lyon (FR); Babak Hodjat, Dublin, CA (US); Risto Miikkulainen, Stanford, CA (US); Hormoz Shahrzad, Dublin, CA (US)

(*) Notice: Subject to any disclaimer, the term of this patent is extended or adjusted under 35 U.S.C. 154(b) by 759 days.

(21) Appl. No.: 16/831,550

(22) Filed: Mar. 26, 2020

(65) Prior Publication Data

US 2020/0311556 A1 Oct. 1, 2020

Related U.S. Application Data

(60) Provisional application No. 62/824,909, filed on Mar. 27, 2019.

(51) Int. Cl.
*G06N 3/04* (2023.01)
*G06N 3/086* (2023.01)
*G06N 3/042* (2023.01)
*G06N 20/20* (2019.01)
*G06N 5/01* (2023.01)

(52) U.S. Cl.
CPC ............ *G06N 3/086* (2013.01); *G06N 3/042* (2023.01); *G06N 5/01* (2023.01); *G06N 20/20* (2019.01)

(58) Field of Classification Search
None
See application file for complete search history.

(56) References Cited

U.S. PATENT DOCUMENTS

| | | | |
|---|---|---|---|
| 5,140,530 A | 8/1992 | Guha et al. | |
| 5,761,381 A | 6/1998 | Arci | |
| 5,845,266 A | 12/1998 | Lupien et al. | |
| 5,920,848 A | 7/1999 | Schutzer et al. | |

(Continued)

FOREIGN PATENT DOCUMENTS

| | | |
|---|---|---|
| EP | 0762294 A2 | 3/1997 |
| EP | 2422276 | 2/2012 |

(Continued)

OTHER PUBLICATIONS

Pan et al ("A Classification-Based Surrogate-Assisted Evolutionary Algorithm for Expensive Many-objective Optimization" Feb. 2019) (Year: 2019).*

(Continued)

*Primary Examiner* — Lut Wong
(74) *Attorney, Agent, or Firm* — Dawn-Marie Bey; Bey & Cotropia PLLC

(57) ABSTRACT

A surrogate-assisted evolutionary optimization method, ESP, discovers decision strategies in real-world applications. Based on historical data, a surrogate is learned and used to evaluate candidate policies with minimal exploration cost. Extended into sequential decision making, ESP is highly sample efficient, has low variance, and low regret, making the policies reliable and safe. As an unexpected result, the surrogate also regularizes decision making, making it sometimes possible to discover good policies even when direct evolution fails.

10 Claims, 12 Drawing Sheets

(56) References Cited

U.S. PATENT DOCUMENTS

| | | |
|---|---|---|
| 5,930,780 A | 7/1999 | Hughes et al. |
| 6,240,399 B1 | 5/2001 | Frank et al. |
| 6,249,783 B1 | 6/2001 | Crone et al. |
| 6,941,287 B1 | 9/2005 | Vaidyanathan |
| 7,013,344 B2 | 3/2006 | Megiddo |
| 7,246,075 B1 | 7/2007 | Testa |
| 7,370,013 B1 | 5/2008 | Aziz et al. |
| 7,444,309 B2 | 10/2008 | Branke et al. |
| 8,065,244 B2 | 11/2011 | Chen et al. |
| 8,527,433 B2 | 9/2013 | Hodjat et al. |
| 8,639,545 B2 | 1/2014 | Cases |
| 8,768,811 B2 | 7/2014 | Hodjat et al. |
| 8,775,341 B1 | 7/2014 | Commons |
| 8,825,560 B2 | 9/2014 | Hodjat |
| 8,909,570 B1 | 12/2014 | Hodjat et al. |
| 8,918,349 B2 | 12/2014 | Hodjat et al. |
| 8,977,581 B2 | 3/2015 | Hodjat et al. |
| 9,002,759 B2 | 4/2015 | Hodjat et al. |
| 9,015,093 B1 | 4/2015 | Commons |
| 9,053,431 B1 | 6/2015 | Commons |
| 9,466,023 B1 | 10/2016 | Shahrzad et al. |
| 9,489,630 B2 | 11/2016 | Achin et al. |
| 9,785,886 B1 | 10/2017 | Andoni |
| 10,255,529 B2 | 4/2019 | Rabinovich |
| 10,268,953 B1 | 4/2019 | Fink et al. |
| 10,430,709 B2 | 10/2019 | Shahrzad et al. |
| 10,699,194 B2 | 6/2020 | David |
| 10,970,441 B1 | 4/2021 | Zhang |
| 11,003,997 B1 | 5/2021 | Blackwood |
| 2002/0019844 A1 | 2/2002 | Kurowski et al. |
| 2002/0080169 A1 | 6/2002 | Diederiks |
| 2003/0014379 A1 | 1/2003 | Saias |
| 2003/0149603 A1 | 8/2003 | Ferguson et al. |
| 2003/0158887 A1 | 8/2003 | Megiddo |
| 2004/0143559 A1 | 7/2004 | Ayala |
| 2004/0210545 A1 | 10/2004 | Branke et al. |
| 2004/0254901 A1 | 12/2004 | Bonabeau et al. |
| 2005/0033672 A1 | 2/2005 | Lasry et al. |
| 2005/0136480 A1 | 6/2005 | Brahmachari |
| 2005/0187848 A1 | 8/2005 | Bonissone et al. |
| 2005/0197875 A1 | 9/2005 | Kauffman |
| 2005/0198103 A1 | 9/2005 | Ching |
| 2006/0218107 A1 | 9/2006 | Young |
| 2006/0247973 A1 | 11/2006 | Mueller |
| 2007/0094161 A1 | 4/2007 | Calabro |
| 2007/0100907 A1 | 5/2007 | Bayer |
| 2007/0143198 A1 | 6/2007 | Brandes et al. |
| 2007/0143759 A1 | 6/2007 | Ozgur et al. |
| 2007/0150435 A1 | 6/2007 | Murakawa |
| 2007/0185990 A1 | 8/2007 | Ono et al. |
| 2008/0071588 A1 | 3/2008 | Eder |
| 2008/0228644 A1 | 9/2008 | Birkestrand et al. |
| 2009/0125370 A1 | 5/2009 | Blondeau et al. |
| 2009/0307638 A1 | 12/2009 | McConaghy |
| 2009/0327178 A1 | 12/2009 | Jacobson |
| 2010/0018293 A1 | 1/2010 | Monkowski |
| 2010/0030720 A1 | 2/2010 | Stephens |
| 2010/0111991 A1 | 5/2010 | Raitano |
| 2010/0182935 A1 | 7/2010 | David |
| 2010/0256795 A1 | 10/2010 | McLaughlin |
| 2010/0257228 A1 | 10/2010 | Staggs |
| 2010/0257605 A1 | 10/2010 | McLaughlin |
| 2010/0274736 A1 | 10/2010 | Hodjat et al. |
| 2010/0274742 A1 | 10/2010 | Hodjat et al. |
| 2010/0293119 A1 | 11/2010 | Ferringer et al. |
| 2011/0040596 A1 | 2/2011 | Chen |
| 2011/0161264 A1 | 6/2011 | Cantin |
| 2011/0246834 A1 | 10/2011 | Rajashekara |
| 2012/0239517 A1 | 9/2012 | Blondeau |
| 2012/0239592 A1 | 9/2012 | Esbensen |
| 2012/0313798 A1 | 12/2012 | Markram |
| 2013/0006901 A1 | 1/2013 | Cantin |
| 2013/0124440 A1 | 5/2013 | Hodjat et al. |
| 2013/0138436 A1 | 5/2013 | Yu |
| 2013/0254142 A1 | 9/2013 | Hodjat |
| 2013/0311412 A1 | 11/2013 | Lazar |
| 2014/0006316 A1 | 1/2014 | Hodjat |
| 2014/0011982 A1 | 1/2014 | Marasco |
| 2014/0019388 A1 | 1/2014 | Kingsbury |
| 2014/0229362 A1 | 8/2014 | Hodjat |
| 2015/0046181 A1 | 2/2015 | Adjaoute |
| 2015/0136602 A1 | 5/2015 | Jovanovich |
| 2015/0288573 A1 | 10/2015 | Baughman |
| 2015/0331908 A1 | 11/2015 | Duffy |
| 2015/0356461 A1 | 12/2015 | Vinyals |
| 2016/0048753 A1 | 2/2016 | Sussillo |
| 2016/0063359 A1 | 3/2016 | Szegedy |
| 2016/0232445 A1 | 8/2016 | Srinivasan |
| 2016/0242690 A1 | 8/2016 | Principe |
| 2016/0283563 A1 | 9/2016 | Hodjat |
| 2016/0328253 A1 | 11/2016 | Majumdar |
| 2016/0329047 A1 | 11/2016 | Tur |
| 2016/0329407 A1 | 11/2016 | Takemura |
| 2016/0350671 A1 | 12/2016 | Morris, II et al. |
| 2016/0364522 A1 | 12/2016 | Frey |
| 2017/0001093 A1 | 1/2017 | Mollice |
| 2017/0060963 A1 | 3/2017 | Whittaker |
| 2017/0063908 A1 | 3/2017 | Muddu |
| 2017/0109355 A1 | 4/2017 | Li |
| 2017/0116520 A1 | 4/2017 | Min |
| 2017/0132528 A1 | 5/2017 | Aslan |
| 2017/0148433 A1 | 5/2017 | Catanzaro |
| 2017/0192638 A1 | 7/2017 | Iscoe |
| 2017/0193366 A1 | 7/2017 | Miikkulainen |
| 2017/0193367 A1 | 7/2017 | Miikkulainen |
| 2017/0193403 A1 | 7/2017 | Iscoe |
| 2017/0213156 A1 | 7/2017 | Hammond |
| 2017/0256254 A1 | 9/2017 | Huang |
| 2017/0262737 A1 | 9/2017 | Rabinovich |
| 2017/0270225 A1 | 9/2017 | Chen et al. |
| 2017/0293849 A1 | 10/2017 | Hodjat et al. |
| 2017/0323219 A1 | 11/2017 | Shahrzad |
| 2017/0323636 A1 | 11/2017 | Xiao |
| 2018/0018590 A1 | 1/2018 | Szeto |
| 2018/0053092 A1 | 2/2018 | Hajizadeh |
| 2018/0114115 A1 | 4/2018 | Zhi |
| 2018/0114116 A1 | 4/2018 | Liang |
| 2018/0157972 A1 | 6/2018 | Hu |
| 2018/0240041 A1 | 8/2018 | Koch |
| 2018/0293498 A1 | 10/2018 | Campos |
| 2018/0357552 A1 | 12/2018 | Campos |
| 2018/0365557 A1 | 12/2018 | Kobayashi |
| 2018/0365564 A1 | 12/2018 | Huang |
| 2019/0065954 A1 | 2/2019 | Bittner, Jr. |
| 2019/0147298 A1 | 5/2019 | Rabinovich |
| 2019/0244108 A1 | 8/2019 | Meyerson |
| 2019/0332678 A1 | 10/2019 | Ishida |
| 2020/0311556 A1 | 10/2020 | Francon |

FOREIGN PATENT DOCUMENTS

| | | |
|---|---|---|
| EP | 2422278 | 2/2012 |
| JP | H0810804 | 1/1996 |
| JP | 08-110804 | 4/1996 |
| JP | H09114797 A | 5/1997 |
| JP | 2001325041 | 11/2001 |
| JP | 2003044665 | 2/2003 |
| JP | 2004240671 | 8/2004 |
| JP | 200430741 | 10/2004 |
| JP | 2005190372 A | 7/2005 |
| JP | 2007052247 | 3/2007 |
| JP | 2007207173 | 8/2007 |
| JP | 2007522547 | 8/2007 |
| JP | 2008129984 A | 6/2008 |
| WO | WO 2005/073854 | 8/2005 |
| WO | 2010120440 A2 | 10/2010 |
| WO | WO 2010/127039 | 11/2010 |
| WO | WO 2010/127042 | 11/2010 |
| WO | 2017161233 | 9/2017 |
| WO | 2018211138 | 11/2018 |
| WO | 2018213840 | 11/2018 |
| WO | 2018223822 A1 | 12/2018 |

(56) References Cited

FOREIGN PATENT DOCUMENTS

| WO | 2019081705 | 5/2019 |
|---|---|---|
| WO | WO 2019/217876 | 11/2019 |

OTHER PUBLICATIONS

Manríquez et al ("A Review of Surrogate Assisted Multiobjective Evolutionary Algorithms" 2016) (Year: 2016).*
Robinet et al ("Inducing High-Level Behaviors from Problem-Solving Traces Using Machine-Learning Tools" 2007) (Year: 2007).*
Lehman et al., "Extinction Events Can Accelerate Evolution," PLOS ONE, journal.pone.0132886, Aug. 12, 2015, 16 pages.
Lehman et al., "Overcoming Deception in Evolution of Cognitive Behaviors," University of Texas at Austin, ACM, Jul. 12-16, 2014, 8 pages.
Lehman et al., "Revising the Evolutionary Computation Abstraction: Minimal Criteria Novelty Search," Proceedings of the Genetic and Evolutionary Computation Conference, ACM, Copyright 2010, 8 pages.
Lehman, Joel, et al., "Exploiting Open-Endedness to Solve Problems Through the Search for Novelty," ALIFE, 8 pages, 2008.
Liang, et al., "Population-Based Training for Loss Function Optimization," 10 pages, arXiv:2002.04225vl (Feb. 11, 2020).
Lin Wang, et al., "Knowledge Distillation and Student-Teacher Learning for Visual Intelligence: A Review and New Outlooks," Journal of Latex Class Files, vol. 14, No. 8, Apr. 2020, 38 pp., arXiv: 2004/05937v3, May 4, 2020.
Lopez Haimes et al., "MRMOGA: parallel evolutionary multiobjective optimization using multiple resolutions," In: Proceedings of IEEE Congress on Evolutionary Computation, 2294-2301, 2005.
Mahmoudpour et al., Diagnosis of Distributed Denial of Service Attacks using the Combination Method of Fuzzy Neural Network and Evolutionary Algorithm, Indian Journal of Science and Technology, vol. 8(28), DOI: 10.17485/ijst/2015/v8i28/81820, Oct. 2015; pp. 1-7 (Year: 2015).
Meyerson, Elliot, "Discovering Multi-Purpose Modules Through Deep Multitask Learning," Dissertation Presented to the Faculty of the Graduate School of The University of Texas at Austin, Dec. 2018, 275 pp.
Meyerson, et al., "Pseudo-Task Augmentation: From Deep Multitask Learning to Intratask Sharing and Back," arXiv: 1803.04062, 10 pages, 2018.
Miikkulainen et al, Mar. 3, 2017, "Evolving Deep Neural Networks" (Year: 2017).
Miikkulainen et al., "From Prediction to Prescription: Evolutionary Optimization of Non-Pharmaceutical Interventions in the COVID-19 Pandemic", arxiv.org, Aug. 1, 2020, retrieved on [Nov. 11, 2022]. Retrieved from the internet <URL: https://arxiv.org/pdf/2005.13766.pdf>.
Miikkulainen, Risto, et al., "Evolving Deep Neural Networks," Mar. 4, 2017, 8 pp.
Minsoo Kang, et al., "Towards Oracle Knowledge Distillation With Neural Architecture Search," arXiv: 1911.13019vl, Nov. 29, 2019, 9 pp.
Misra et al., "Cross-stitch networks for multi-task learning," In Proceedings of the IEEE Conference on Computer Vision and Pattern Recognition, pp. 3994-4003. 2016.
Moriarty etal., "Hierarchical Evolution of Neural Networks", IEEE (1998). (Year: 1998) 6 pages.
Moriarty, David E., et al., "Forming neural networks through efficient and adaptive coevolution," Evolutionary Computation 5.4, 28 pages, 1997.
N. Hansen, et al, "Adapting arbitrary normal mutation distributions in evolution strategies:The covariance matrix adaptation," In Proceedings of IEEE International Conference on Evolutionary Computation, pp. 312-317, IEEE, 1996.
N. Hansen, et al., "Evaluating the CMA evolution strategy on multimodal test functions," International Conference on Parallel Problem Solving from Nature, Springer, pp. 282-291, 2004.
Notice of Allowance for U.S. Appl. No. 13/358,381, dated Nov. 19, 2014, 5 pp.
Notice of Allowance for U.S. Appl. No. 13/540,507, dated Oct. 31, 2014, 9 pp.
O'Reilly et al., "EC-Star: A Massive-Scale, Hub and Spoke, Distributed Genetic Programming System", In: Riolo etal, Genetic Programming Theory and Practice X, Apr. 19, 2013, Genetic and Evolutionary Computation, pp. 73-85 (Year: 2013).
Oreski et al., Hybrid system with genetic algorithm and artificial neural networks and its application to retail credit risk assessment, Expert Systems with Applications 39 (2012); pp. 12605-12617 (Year: 2012).
Pantridge et al., Evolution of Layer Based Neural Networks: Preliminary Report, GECCO '16, pp. 1015-1022, Jul. 2016. (Year: 2016).
Paul Micaelli, et al., "Zero-Shot Knowledge Transfer via Adversarial Belief Matching," 33rd Conference on Neural Information Processing Systems, (NEURIPS 2019), Vancouver, CA, arXiv: 1905.09768v4, Nov. 25, 2019, 13 pp.
Pouya Bashivan, et al., "Teacher Guided Architecture Search," arXiv: 1808.01405v3, Sep. 6, 2019, 15pp.
R. Miikkulainen, J. Liang, E. Meyerson, et al., 2017, "Evolving Deep Neural Networks," CoRR, abs/1703.00548, Mar. 2017. 73 pages.
R. Poli, W. B. Langdon, N. F. McPhee, J. R. Koza, "Genetic programming: An introductory tutorial and a survey of techniques and applications", University of Essex, School of Computer Science and Electronic Engineering, Technical Report, (200710), No. CES-475, ISSN 1744-8050, XP055038163.
Raphael Gontijo Lopes, et al., "Data-Free Knowledge Distillation for Deep Neural Networks," arXiv: 1710.07535v2, Nov. 23, 2017, 8 pp.
Rennie, Annealed dropout training of deep networks, 2014 IEEE Spoken Language Technology Workshop (SLT) 2014 (Year: 2014) 6 pages.
Risto Miikkulailien, "Evolving Multitask Neural Network Structure," The University of Texas at Austin and Sentient Technologies. Inc . Aug. 26, 2013, 22 pages.
Risto Miikkulainen, "Creative AI Through Evolutionary Computation: Principles and Examples," SN Computer Science, 2:163, 2021, https://do1.org/10,1007/s42979-021-00540-9, 7 pp.
Risto Miikkulainen, "From Prediction to Prescription: Evolutionary Optimization of Non-Pharmaceutical Interventions in the COVID-19 Pandemic," arXiv: 2005.13766v3, Aug. 1, 2020, 34 pp.
Risto Miikkulainen, et al., "From Prediction to Prescription: Evolutionary Optimization of Nonpharmaceutical Interventions in the COVID-19 Pandemic," IEEE Transactions on Evolutionary Computation, vol. 25, No. 2, Apr. 2021. 16 pp.
Rosenbaum, et al., "Routing Networks: Adaptive Selection of Non-Linear Functions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2. 16 pages.
Ruder,"An Overview of Multi-Task Learning in Deep Neural Networks," In: Cornell University Library /Computer Science/Machine Learning, Jun. 15, 2017 [online] [retrieved on Mar. 15, 2019], Retrieved from the Internet: https://arxrv.org/abs/1706.05098, 14 pages.
Salge, C., et. al, "Empowerment—An Introduction," published in Guided Self-Organization: Inception, Chap 4, University of Hertfordshire, Copyright 2014, pp. 67-114.
Sanchez, "Advocating the Use of Imprecisely Observed Data in Genetic Fuzzy Systems", IEEE, 2007 (Year: 2007). 12 pages.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019. 10 pages.
Santiago Gonzalez, et al., "Improved Training Speed, Accuracy, and Data Utilization Through Loss Function Optimization," Version 2, arXiv: 1905.11528v2, dated Feb. 10, 2020. 7 pages.

(56) References Cited

OTHER PUBLICATIONS

Santiago Gonzalez, et al., "Improved Training Speed, Accuracy, and Data Utilization Through Loss Function Optimization," Version 3, arXiv: 1905.11528v3, dated Apr. 27, 2020. 7 pages.
Scott, E. O., et. al., "Understanding Simple Asynchronous Evolutionary Algorithms," Jan. 17-20, 2015, 15 pp.
Secretan, J., et al., "Picbreeder: A Case Study in Collaborative Evolutionary Exploration of Design Space," Evolutionary Computation journal, MIT Press, Copyright 2011, 30 pages.
Shahrzad, et al., "Tackling the Boolean Multiplexer Function Using a Highly Distributed Genetic Programming System," in Genetic Programming Theory and Practice XII, 7 pp., 2015.
Shazeer et al., "Outrageously large neural networks: The sparsely-gated mixiure of-experts layer," arXiv preprint arXiv:1701.08538 (2017), 19 pages.
Shi, 2008, "An Empirical Comparison of Evolution and Coevolution for Designing Artificial Neural Network Game Players" (Year: 2008).
Snoek, et al., "Scalable Bayesian Optimization Using Deep Neural Networks", 2015, 13 pages.
Stanley et al. "Evolving neural networks through augmenting topologies." Evolutionary computation 10.2, 29 pages (2002) (Year: 2002).
Stanley et al., Why greatness cannot be planned: the myth of the objective, Genet. Program Evolvable Mach.,m 16:559-561, 2015.
Stanley, 2002, "Evolving Neural Networks Through Augmenting Topologies" (Year: 2002).
Stanley, et al., "Why Greatness Cannot Be Planned: The Myth of the Objective," New York, NY, Springer (2015). 2 pages.
Stanley, Kenneth O., et al., "Real-Time Evolution of Neural Networks in the Nero Video Game," AAAI, vol. 6, 2006, 4 pp.
Storsveen et al, 2008, "Evolving a 2D Model of an Eye using CPPNs" (Year: 2008).
Supplementary European Search Report dated Oct. 12, 2012 in EP 10770288, 12 pages.
Supplementary European Search Report dated Oct. 9, 2012 in EP 107702871, 11 pages.
Timothy Hospedales, et al., "Meta-Learning in Neural Networks: A Survey," arXiv: 2004.05439vl, Apr. 11, 2020, 23 pp.
U.S. Appl. No. 13/184,307—Notice of Allowance dated Aug. 4, 2014, 9 pages.
U.S. Appl. No. 13/184,307—Office Action dated Oct. 21, 2013, 16 pages.
U.S. Appl. No. 14/595,991—Final Office Action dated Feb. 27, 2018, 25 pages.
U.S. Appl. No. 14/595,991—Response to Final Office Action dated Feb. 27, 2018, filed May 22, 2018, 32 pages.
U.S. Appl. No. 14/595,991—Response to Final Office Action dated Feb. 27, 2018, filed Jul. 27, 2018, 41 pages.
U.S. Appl. No. 13/184,307—Response dated Jan. 22, 2014, 19 pages.
U.S. Appl. No. 13/184,307—Response dated Jun. 23, 2014, 32 pages.
U.S. Appl. No. 13/358,381—Response dated Oct. 3, 2014, 21 pages.
U.S. Appl. No. 13/358,381—Amendment After Allowance filed Feb. 13, 2015, 20 pages.
U.S. Appl. No. 13/540,507—Response filed Oct. 15, 2014, 20 pages.
U.S. Appl. No. 13/895,238—Office Action dated Jan. 2, 2014, 17 pages.
U.S. Appl. No. 13/943,630—Amendment After Allowance dated Mar. 15, 2016, 16 pages.
U.S. Appl. No. 13/943,630—Notice of Allowance dated Jan. 21, 2016, 28 pages.
U.S. Appl. No. 13/943,630—Notice of Allowance dated May 19, 2016, 2 pages.
U.S. Appl. No. 13/943,630—Office Action dated May 27, 2015, 42 pages.
U.S. Appl. No. 13/943,630—Response to Office Action dated May 27, 2015 filed Sep. 23, 2015, 8 pages.
U.S. Appl. No. 13/945,630—Amendmend After Allowance dated Dec. 9, 2015, 7 pages.
U.S. Appl. No. 13/945,630—Final Office Action dated Aug. 4, 2015, 22 pages.
U.S. Appl. No. 13/945,630—Notice of Allowance dated Nov. 18, 2015, 8 pages.
U.S. Appl. No. 13/945,630—Office Action dated Mar. 12, 2015, 18 pages.
U.S. Appl. No. 13/945,630—Resonse to Office Action dated Mar. 12, 2015 filed Jul. 13, 2015, 9 pages.
U.S. Appl. No. 13/945,630—Response filed Nov. 4, 2015, 12 pp.
U.S. Appl. No. 14/014,063—Office Action dated May 7, 2014, 19 pages.
U.S. Appl. No. 14/539,908—Notice of Allowance dated Mar. 17, 2016, 15 pages.
U.S. Appl. No. 14/539,908—Office Action dated Oct. 1, 2015, 33 pages.
U.S. Appl. No. 14/539,908—Response filed Feb. 1, 2016, 18 pp.
U.S. Appl. No. 14/595,991—Office Action, dated Feb. 27, 2018, 19 pp.
U.S. Appl. No. 14/595,991—Response to Office Action dated May 10, 2017, filed Nov. 10, 2017, 29 pages.
U.S. Appl. No. 15/794,905, titled Evolution of Deep Neural Network Structures, 46 pages, filed Oct. 26, 2017.
U.S. Appl. No. 15/794,913 titled "Cooperative Evolution of Deep Neural Network Structures," filed Oct. 26, 2017.
U.S. Appl. No. 15/915,028, titled "Asynchronous Evaluation Strategy For Evolution of Deep Neural Networks," filed Mar. 3, 2018.
U.S. Appl. No. 62/468,224, titled "Asynchronous Evaluation Strategy For Evolution of Deep Neural Networks," filed Mar. 7, 2017.
U.S. Appl. No. 62/598,409, titled "Evolving Multitask Neural Network Structure," filed Dec. 13, 2017.
U.S. Appl. No. 62/627,161, titled "From Nodes to Networks: Evolving Recurrent Neural Networks," filed Feb. 6, 2018.
U.S. Appl. No. 62/627,658, titled "From Nodes to Networks: Evolving Recurrent Neural Networks," filed Feb. 7, 2018.
Unpublished Article, Modular Universal Reparameterization: Deep Multi-Task Learning Across Diverse Domains, 10 pp.
U.S. Appl. No. 13/184,307—Office Action dated Mar. 21, 2014, 38 pages.
U.S. Appl. No. 13/358,381—Office Action dated Jul. 8, 2014, 30 pages.
U.S. Appl. No. 13/540,507—Office Action dated Sep. 9, 2014, 25 pages.
Gorunescu, et al., "Evolutionary strategy to develop learning-based decision systems, Application to breast cancer and liver fibrosis stadiallization" [online], Jun. 2014 [retrieved on May 21, 2020], Journal of Biomedical Informatics, vol. 49, pp. 1-32, Retrieved from the Internet: https://reader.elsevier.com/reader/sd/pii/S1532046414000173?token=E3DB70CBA3796F20A3C0B08ABA8E0657EED29D4423C65CF9959714AC34AD580F5755F248C38C14CEBE59D726C456A820.
Kaelbling, et al., Reinforcement Learning: A Survey [online], 1996 [retrieved May 21, 2020], Journal of Artificial Intelligence Research, vol. 4, pp. 237-285, Retrieved from the Internet: https://www.cs.cmu.edu/~tom/10701_sp11/slides/Kaelbling.pdf.
International Search Report and Written Opinion for PCT App. No. PCT/US20/25046, dated Jun. 23, 2020, 9 pp.
Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.
Gonzalez, et al., "Evolving Loss Functions With Multivariate Taylor Polynomial Parameterization," Version 2, published arXiv: 2002.00059v2), Feb. 10, 2020, 8 pages.
Gonzalez, et al., "Evolving Loss Functions With Multivariate Taylor Polynomial Parameterizations," Version 1, published arXiv: 2002.00059v1, Jan. 31, 2020. 12 pages.
Gonzalez, et al., "Optimizing Loss Functions Through Multivariate Taylor Polynomial Parameterization," Version 3 (published arXiv:2002.00059v3), Jun. 6, 2020, 13 pages.

(56) References Cited

OTHER PUBLICATIONS

Gupta et al., "An Overview of methods maintaining Diversity in Generic Algorithms," International Journal of Emerging Technology and Advanced Engineering, vol. 2, Issue 5, New Delhi, India, May 2012, pp. 56-60.
H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.
Haitong Li, "Exploring Knowledge Distillation of Deep Neural Networks for Efficient Hardware Solutions," CS 230 Final Report, Department of Electrical Engineering, Stanford, CA, 6 pp., 2018.
Hansen, et al., "Completely derandomized self-adaptation in evolution strategies," Evolutionary Computation, vol. 9, No. 2, pp. 159-195, 2001.
Hanting Chen, et al., "Data-Free Learning of Student Networks," arXiv: 1904.01186v4, Dec. 31, 2019, 9 pp.
Hodjat et al., "Maintenance of a Long Running Distributed Genetic Programming System for Solving Problems Requiring Big Data",In: Riolo et al., Genetic Programming Theory and Practice XI, Mar. 10, 2014, Genetic and Evolutionary Computation, pp. 65-83 (Year: 2014).
Hodjat et al., "nPool: Massively Distributed Simultaneous Evolution and Cross-Validation in EC-Star", ppt at GPTP May 2015, 16 pages.
International Preliminary Report on Patentability for PCT App. PCT/US2019/061198, dated Nov. 18, 2020, 24 pp.
International Search Report and Written Opinion for Application No. PCT/US2018/064520, dated Mar. 4, 2019. 8 pages.
International Search Report and Written Opinion for PCT App. No. PCT/US19/61198, dated Mar. 11, 2020, 15 pp.
International Search Report and Written Opinion for PCT Application No. PCT/US18/64428, dated Mar. 26, 2019, 12 pp.
International Search Report and Written Opinion for PCT Application No. PCT/US18/65472, dated Mar. 27, 2019, 8 pp.
International Search Report and Written Opinion for PCT Application No. PCT/US18/66610, dated Apr. 15, 2019, 8 pp.
International Search Report and Written Opinion for PCT Application No. PCT/US2019/017175, dated Jun. 5, 2019, 10 pp.
International Search Report and Written Opinion issued in App. No. PCT/US2022/032656, dated Nov. 4, 2022, 9 pages.
Ishibuchi, "Three-objective genetics-based machine learning for linguistic rule extraction", IEEE, 2005 (Year: 2005). 25 pages.
J. Z. Liang, et al., "Evolutionary Architecture Search For Deep Multitask Networks," GECCO, 2018.
J.T. Barron, "A General and Adaptive Robust Loss Function," arXiv: 1701.03077, 2018, 19 pages.
Jaemin Yoo, et al., "Knowledge Extraction With No Observable Data," 33rd Conference on Neural Information Processing Systems (NeurIPS 2019), Vancouver, Canada, 2019, 10 pp.
Jaimes & Coello, 2005, "MRMOGA: Parallel Evolutionary Multiobjective Optimization using Multiple Resolutions" (Year: 2005).
James Bradbury, et al., "Quasi-Recurrent Neural Networks," arXiv:1611. 01576v2, Nov. 21, 2016, 11 pp .; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.
Jason Liang, et al., "Evolutionary Neural AutoML for Deep Learning," GECCO '19, Jul. 13-17, 2019, Prague, Czech Republic (https://arxiv.org/pdf/1902.06827.pdf).
Jee-weon Jung, et al., "Distilling the Knowledge of Specialist Deep Neural Networks in Acoustic Scene Classification," Detection and Classification of Acoustic Scenes and Events 2019, New York, New York, Oct. 25-26, 2019, 5 pp.
Ji Wang, et al., "Private Model Compression via Knowledge Distillation," arXiv: 1811.05072vl, Nov. 13, 2018, 9 pp.
Jin & Sendhoff, 2008, "Pareto-Based Multiobjective Machine Learning: An Overview and Case Studies" (Year: 2008).
JP 2010-533295—Office Action, dated Apr. 16, 2013, 3 pp. (English translation). 3 pages.
JP 2012-508660-Office Action dated Apr. 1, 2014, 8 pages.
JP 2012-508663-Office Action dated Apr. 1, 2014, 6 pages.
Juille, H., "Evolution of Non-Deterministic Incremental Algorithms as a New Approach for Search in State Spaces," Proc. 6th Int'l. Conf. on Genetic Algorithms, 1995 8 pp.
Jul. 27, 2012 Final Office Action in U.S. Appl. No. 12/267,287, 14 pp.
Julian G. Zilly, Rupesh Kumar Srivastava, Jan ICoutnik, and Jurgen Schniidhuber, "Recurrent Hiehwav Networks." CoRR abs/1607. 03474. 2016 (Arxiv: 1607.03474} 13 pages.
Jun. 16, 2011 Written Opinion from Singapore Patent Office in related application SG 201003127-68 pp.
Jun. 16, 2011 Written Opinion from Singapore Patent Office in related application SG 201093127-6, 9 pp.
K. Janocha and W. M. Czarnecki, "On Loss Functions for Deep Neural Networks in Classification," arXiv: 1702.05659, 10 pages, 2017.
Kang, Zhuoliang, et al., "Learning With Whom to Share in Multi-Task Feature Learning," Proceedings of the 28th International Conference on Machine Learning, Bellevue, WA, USA, 2011, 8 pp.
Kenneth O. Stanley and Risto Miikkulainen, "Evolving Neural Networks Through Augmenting Topologies," Evolutionary Computation, 10(2):99-127, 2002.
Kipfer et al., "UberFlow: A GPU-Based Particle Engine," Computer Graphics and Visualization, The Eurographics Association, Copyright 2004, 9 pages.
Kosorukoff, A. "Using incremental evaluation and adaptive choice of operators in a genetic algorithm," Proc. Genetic and Evolutionary Computation Conference, GECCO—Sep. 2002, 7pp.
Krcah, P., et al., "Combination of Novelty Search and Fitness-Based Search Applied to Robot Body-Brain Co- Evolution," Charles University, Prague Czech Republic, in Proceedings of the 13th Czech-Japan Seminar on Data Analysis and Decision Making in Service Science, 2010, 6 pages.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pp.
Kwedlo, "Learning Decision Rules Using a Distributed Evolutionary Algorithm", 2002 (Year: 2002). 10 pages.
Lahsasna, "Design of a Fuzzy-based Decision Support System for Coronary Heart Disease Diagnosis", (Year: 2012). 14 pages.
Lee, Chi-Ho, et al., "Evolutionary ordered neural network with a linked-list encoding scheme," Proceedings of IEEE International Conference on Evolutionary Computation, IEEE, 5 pages, 1996.
Lehman et al., "Evolving a Diversity of Creatures through Novelty Search and Local Competition," Proceedings of the Genetic and Evolutionary Computation Conference, ACM, New York, NY, 2011, 8 pages.
Lehman et al., "Abandoning Objectives: Evolution through the Search for Novelty Alone," Evolutionary Computation journal, MIT Press, Copyright 2011, pp. 189-223.
Lehman et al., "Efficiently Evolving Programs through the Search for Novelty," Proceedings of the Genetic and Evolutionary Computation Conference, ACM, New York NY, Copyright 2010, 8 pages.
Alejandro Barredo Arrietz, et al., "Explainable Artificial Intelligence (XAI): Concepts, Taxonomies, Opportunities and Challenges Toward Responsible AI," https://arxiv.org/pdf/1910.10045.pdf, 2019.
European Parliamentary Research Service, "Understanding Algorithmic Decision- Making: Opportunities and Challenges," https://www.europarl.europa.eu/RegData/etudes/STUD/2019/624261/EPRS_STU(2019)624261_EN.pdf, 2019.
Blen M. Keneni, "Evolving Rule Based Explainable Artificial Intelligence for Decision Support System of Unmanned Aerial Vehicles," Evolving_Rule_Based_Explainable_Artificial_Intelli. pdf, 2018.
Riccardo Guidotti, et al., "A Survey of Methods for Explaining Black Box Models," https://dl.acm.org/doi/fullHtml/10.1145/3236009, 2018.
Ilya Loshchilov, "Surrogate-Assisted Evolutionary Algorithms," https://tel.archives-ouvertes.fr/tel-00823881/document, 2013.

(56) References Cited

OTHER PUBLICATIONS

Alan Diaz-Manriquez, et al., "A Review of Surrogate Assisted Multiobjective Evolutionary Algorithms," http://downloads.hindawi.com/journals/cin/2016/9420460.pdf, 2016.
Erwan Le Merrer, et al, "The Bouncer Problem: Challenges to Remote Explainability," https://arxiv.org/pdf/1910.01432.pdf, 2020.
Alain Chabrier, IBM, "Explaining Decision Optimization Prescriptions," https://medium.com/ibm-watson/explaining-decision-optimization-prescriptions-7103abbc44e5, 2019.
Zhiwei Zeng, et al., "Context-Based and Explainable Decision Making With Argumentation," http://ifaamas.org/Proceedings/aamas2018/opdfs/p1114.pdf, 2018.
Jakob Bossek, et al., "One-Shot Decision-Making With and Without Surrogates," https://arxiv.org/pdf/1912.08956v1.pdf, 2019.
Cynthia Rudin, "Stop Explaining Black Box Machine Learning Models for High Stakes Decisions and Use Interpretable Models Instead," https://www.nature.com/articles/s42256-019-0048-x, 2019.
Maribel Lopez, "Preparing for AI Ethics and Explainability in 2020," https://www.forbes.com/sites/maribellopez/2020/01/21/preparing-for-ai-ethics-and-explainability-in-2020/#15b37b022f6e, 2020.
Goodman, et al., "European Union (EU) regulations on algorithmic decision-making and a 'right to explanation,'" arXiv: 1606.08813V3, Aug. 2016.
Qiu, X. et al., "Quantifying Point-Prediction Uncertainty in Neural Networks via Residual Estimation with an I/O Kernel," In Proceedings of the Eighth International Conference on Learning Regresentations (ICLR) (2020).
Hodjat, B. et al., "PRETSL: Distributed Probabilistic Rule Evolution for Time-Series Classification," In Genetic Programming Theory and Practice XIV. Springer, 139-148 (2018).
Meyerson, E. et al., "Discovering evolutionary stepping stones through behavior domination," In Proceedings of the Genetic and Evolutionary Computation Conference (GECCO 2017).
Miikkulainen, R. et al., Sentient ascend: AI-based massively multivariate conversion rate optimization, In Proceedings of the Thirtieth Innovative Applications of Artificial Intelligence Conference, AAAI (2018).
Miikkulainen et al., Ascend by Evolv: AI-Based Massively Multivariate Conversion Rate Optimization, AI Magazine (2019).
Johnson et al., "Flavor-Cyber-Agriculture: Optimization of plant metabolites in an open-source control environment through surrogate modeling," PLOS ONE (2019), https://doi.org/10.1371/journal.pone.0213918.
Stanley, K. et al, "Designing neural networks through neuroevolution," Nature Machine Intelligence, vol. 1, p. 24-35 (Jan. 2019).
Risto Miikkulainen, "Creative AI Through Evolutionary Computation," arXiv: 1901.03775V2, Feb. 22, 2020.
Diesenroth, M. and Rasmussen, C. E., "PILCO: A model-based and data-efficient approach to policy search," In Proceedings of the $28^{th}$ International Conference on Machine Learning (ICML) (ICML '11), pp. 465-472, 2011.
Ha, D. and Schmidhuber, Jr., "Recurrent World Models Facilitate Policy Evolution," In Advances in Neural Information Processing Systems 32 (NIPS '18), Curran Associates, Inc., Red Hook, NY, USA, pp. 2455-2467, 2018.
Wahlström, N., Schön, T. B., and Deisenroth, M. P., "From pixels to torques: Policy learning with deep dynamical models," arXiV preprint arXiv: 150202251, 2015.
Mnih, V., Kavukcuoglu, K., Silver, D., Rusu, A. A., Veness, J., Bellemare, M. G., Graves, A., Riedmiller, M., Fidjeland, A. K., Ostrovski, G., and others, "Human-level control through deep reinforcement learning," Nature 518, 7540, pp. 529-533, 2015.
Hasselt, H. V., "Double Q-learning," In Advances in Neural Information Processing Systems 23, J. D. Lafferty, C. K. I. Williams, J. Shawe-Taylor, R. S. Zemel, and A. Culotta (Eds.), Curran Associates, Inc., pp. 2613-2621, 2010.
Wang, Z., Schaul, T., Hessel, M., Van Hasselt, H., Lanctot, M., and De Freitas, "Dueling Network Architectures for Deep Reinforcement Learning," In Proceedings of the $33^{rd}$ International Conference on Machine Learning (ICML) (ICML '16), vol. 48, JMLR org., 1995-2003.
Mnih, V., Badia, A. P., Mirza, M., Graves, A., Lillicrap, T., Harley, T., Silver, D., and Kavukcuoglu, "Asynchronous methods for deep reinforcement learning," (ICML) (ICML '16), pp. 1928-1937, 2016.
Schulman, J., Wolski, F., Dhariwal, P., Radford, A., and Klimov, O., "Proximal Policy Optimization Algorithms," CoRR abs/1707.06347, 2017.
Houthooft, R., Chen, Y., Isola, P., Stadie, B., Wolski, F., Ho, O. J., and Abbeel, P., "Evolved policy gradients," In Advances in Neural Information Processing Systems 31, Curran Associates, Inc., pp. 5400-5409, 2018.
Khadka, et al., "Evolution-Guided Policy Gradient in Reinforcement Learning," $32^{nd}$ Conference on Neural Information Processing Systems, 2018.
Pourchot, et al., "CEM-RL: Combining Evolutionary and Gradient-Based Methods for Policy Search," ICLR, 2019.
Application as filed for U.S. Appl. No. 16/424,686, filed May 29, 2019.
Application as filed for U.S. Appl. No. 16/502,439, filed Jul. 3, 2019.
Application as filed for U.S. Appl. No. 16/879,934, filed May 21, 2020.
Hodjat, et al., "Chapter 5: Introducing an Age-Varying Fitness Estimation Function," Genetic Programming Theory and Practice X, Ed. Riolo, et al., Springer, Apr. 19, 2013, pp. 59-71.
Li, Xiaodong and Kirley, Michael, "The Effects of Varying Population Density in a Fine-Grained Parallel Genetic Algorithm," 2002, CEC'02, Proceedings of the 2002 Congress on Evolutionary Computation, vol. 2, IEEE, 2002.
Fidelis, Marcos Vinicius, Heitor S. Lopes, and Alex A. Freitas, "Discovering Comprehensible Classification Rules With a Genetic Algorithm," Proceedings of the 2000 Congress on Evolutionary Computation, vol. 1, IEEE, 2000.
International Search Report and Written Opinion for PCT Application No. PCT/US2008/82876, dated Dec. 23, 2008, 8 pp.
Koza, J. R., "Genetic Prcgramming: On the Prggramming of Computers by Means of Natural Selection" Dec. 1992, MIT Press, pp. 1-609.
Extended European Search Report for EP Application No. EP 08847214, 9 pp.
Enee, Gilles, et al., "Classifier Systems Evolving Multi-Agent System With Distributed Elitism," Proceedings of the 1999 Congress on Evolutionary Computation (CEC'99), vol. 3:6, Jul. 1999, pp. 1740-1746.
Tanev, I., et al., "Sealable Architecture For Parallel Distributed Implementation of Genetic Programming on Network of Workstations," J. Systems Architecture, vol. 47, Jul. 2001, pp. 557-572.
Streichert, F., "Introduction to Evolutionary Algorithms," paper to be presented Apr. 4, 2002 at the Frankfurt MathFinance Workshop, Mar. 30, 2002, Frankfurt, Germany, XP55038571, 22 p., Retrieved from the Internet: http://www.ra/cs.uni-tuegingen.de/mitarb/streiche/publications/Introduction_to_E_volutionary_Algorithms.pdf.
Written Opinion from Singapore Patent Office in related application SG 201003127-6, dated Jun. 16, 2011, 9 pp.
Exam Report for related application AU 2008323758, dated Apr. 20, 2012, 2 pp.
Sakauchi, et al., UNIFINE: A Next Generation Financial Solution System of Nihon Unisys Ltd., Technology Review 'Unisys,' Japan, Nihon Unisys Ltd., Feb. 28, 2006, vol. 25, No. 4, pp. 14-15.
Office Action from JP 2010-533295, dated Apr. 16, 2013, 12 pp.
Laumanns, Marco, et al., "A Unified Model for Multi-Objective Evolutionary Algorithms with Elitism," IEEE, pp. 46-53, 2000.
Ahn, Change Wook, et al., "Elitism-Based Compact Genetic Algorithms," IEEE, Transactions on Evolutionary Computation, vol. 7, No. 4, pp. 367-385, 2003.
Hornby, Gregory S., "The Age-Layered Population Structure (ALPS) Evolutionary Algorithm," ACM, GECCO '09, 7 pp., 2009.
Hereby, G. S., "ALPS: The Age-Layered Population Structure for Reducing the Problem of Premature Convergence," GECCO '06, Seattle, Jul. 2006, authored by an employee of the U.S. Government, therefore in the public domain, 8 pp.

(56) References Cited

OTHER PUBLICATIONS

Hornby, G. S. "A Steady-State Version of the Age-Layered Population Structure EA," Chapter 1 of Genetic Programming Theory and Practice VII, Riolo, et al., editors, Springer 2009, 16 pp.

Hornby, G. S., "Steady-State ALPS for Real-Valued Problems," GECCO '09, Montreal, Jul. 2009, Assoc. of Computing Machinery, 8 pp.

Idesign lab, "ALPS—The Age-Layered Population Structure," UC Santa Cruz web article printed Mar. 17, 2011, 3 pp., http://idesign.ucsc.edu/projects/alsp.html.

Gaspar-Cunha, A., et al., "A Multi-Objective Evolutionary Algorithm Using Neural Networks to Approximate Fitness Evaluations," Int'l. J. Computers, Systems and Signals, 6(1), pp. 18-36, 2005.

Nelson, A., "Fitness Functions in Evolutionary Robotics: A Survey and Analysis," Robatics and Autonomous Systems 57, 2009, 345-370.

Wu, A. S., et al., "An Incremental Fitness Function for Partitioning Parallel Tasks," Proc. Genetic and Evolutionary Computation Conf., Aug. 2001, 8 pp.

Whitehead, B. A., "Genetic Evolution of Radial Basis Function Coverage Using Orthogonal Niches," IEEE Transactions on Neural Networks, 7:6, Nov. 1996, 1525-28.

Bui, L. T., et al., "Local Models: An Approach to Distributed Multi-Objective Optimization," Computational Optimization and Applications, vol. 42, No. 1, Oct. 2007, pp. 105-139.

Castillo, Tapia M. G., et al., "Applications of Multi-Objective Evolutionary Algorithms in Economics and Finance: A Survey," Proc. IEEE Congress on Evolutionary Computation, Sep. 2007, pp. 532-539.

Ducheyne, E., et al., "Is Fitness Inheritance Useful for Real-World Applications?," Evolutionary Multi-Criterion Optimization, ser. LNCS 2631, Spring 2003, pp. 31-42.

Gopalakrishnan, G., et al., "Optimal Sampling in a Noisy Genetic Algorithm for Risk-Based Remediation Design," Bridging the Gap: Meeting the World's Water and Environmental Resources Challenges, Proc. World Water Congress, 2001, 8 pp.

Juille, H., "Evolution of Non-Deterministic Incremental Algorithms as a New Approach for Search in State Spaces," Proc. $6^{th}$ Int'l. Conf. on Genetic Algorithms, 1995 8 pp.

International Search Report dated Jul. 2, 2010 in PCT/US10/32847.

International Search Report dated Jun. 29, 2010 in PCT/US10/32841.

Sacks, J., et al., "Design and Analysis of Computer Experiments," Statistical Science, 4:4, 1989, 409-435.

Torresen, J., "A Dynamic Fitness Function Applied to Improve the Generalisation When Evolving a Signal Processing Hardware Architecture," Proc. EvoWorkshops, 2002, 267-299 (12 pp.).

Bartlett II, J. E., et al., "Organizational Research: Determining Appropriate Sample Size in Survey Research," IT, Learning, and Performance Journal, 19(1), Spring 2001, 8 pp.

Fitzpatrick, J. M., et al., "Genetic Algorithm in Noisy Environments," Machine Learning 3:101-120, May 1988.

Leon, C., et al., "Parallel Hypervolume-Guided Hyperheuristic for Adapting the Multi-Objective Evolutionary Island Model," Proc. $3^{rd}$ Int'l. Workshop on Nature Inspired Cooperative Strategies for Optimization Studies in Computational Intelligence, vol. 236, Nov. 2008, pp. 261-272.

Lopez, Jaimes A., et al., "MRMOGA: Parallel Evolutionary Multiobjective Optimization Using Multiple Resolutions," Proc. IEEE Congress on Evolutionary Computation, vol. 3, Sep. 2005, pp. 2294-2301.

Davarynejad, M., et al., "A Novel General Framework for Evolutionary Optimization: Adaptive Fuzzy Fitness Granulation," CEC, Sep. 2007, 6 pp.

Davarynejad, M., "Fuzzy Fitness Granulation in Evolutionary Algorithms For Complex Optimization," Master of Science Thesis, Ferdowsi Univ. of Mashhad, Jun. 2007, 30 pp.

Salami, M., et al., "A Fast Evaluation Strategy for Evolutionary Algorithms," Applied Soft Computing 2/3F (2003), 156-173.

M.-R. Akbarzadeh-T., et al., "Friendship Modeling for Cooperative Co-Evolutionary Fuzzy Systems: A Hybrid GA-GP Algorithm," Proc. $22^{nd}$ Int'l. Conf. of N. American FIPS, Jul. 2003, pp. 61-66.

Mouret, J. B., et al., "Encouraging Behavioral Diversity in Evolutionary Robotics: An Empirical Study," MIT, Evolutionary Computation, 20(1):91-133, 2012.

Myers, Raymond H. and Montgomery, Douglas C., "Response Surface Methodology: Process and Product Optimization Using Designed Experiments," John Wiley and Sons, Inc., New York, 1995.

Poli, R., et al., "Genetic Programming: An Introductory Tutorial and a Survey of Techniques and Applications," Univ. Essex School of Computer Science and Electronic Engineering Technical Report No. CES-475, Oct. 2007, 112 pp.

Georgilakis, P. S., "Genetic Algorithm Model for Profit Maximization of Generating Companies in Deregulated Electricity Markets," Applied Artificial Intelligence, Jul. 2009, 23:6, 538-552.

Refaeilzadeh, P., et al., "Cross Validation," entry, Encyclopedia of Database Systems, eds. Ozsu and Liu, Springer, 2009, 6 pp.

Remde, S., et al., "Evolution of Fitness Functions to Improve Heuristic Performance," LION, Dec. 8-10, 2007 II, LNCS 5313, pp. 206-219.

Schoreels, C., "Agent Based Genetic Algorithm Employing Financial Technical Analysis For Making Trading Decisions Using Historical Equity Market Data," IEEE/WIC/ACM International Conference on Intelligent Agent Technology (IAT2004), Beijing, China, Sep. 20-24, 2004, pp. 421-424.

Bongard, J. C., et al., "Guarding Against Premature Convergence While Accelerating Evolutionary Search," GECCO '10: Proceedings of the $12^{th}$ Annual Conference on Genetic and Evolutionary Computation, 8 pp. (2010).

"CS 224D: Deep Learning for NLP, Lecture Notes: Part IV", 12 pp., Spring, 2015, 12 pages.

"CS 224D: Deep Learning for NLP, Lecture Notes: Part V", 6 pp., Spring, 2015, 6 pages.

"Revisiting Knowledge Distillation: A Teacher-Free Framework," ICLR 2020, 15 pp.

"CS 224D: Deep Learning for NLP, Lecture Notes: Part III". 14 pp., Spring, 2016.

Jun. 22, 2011 Office Action in U.S. Appl. No. 12/267,287, 16 pp.

Aug. 1, 2012 Office Action in U.S. Appl. No. 13/443,546, 12 pp.

Aditya Rawal and Risto Miikkulainen, "From Nodes to Networks: Evolving Recurrent Neural Networks, " GECCO '18, Jul. 15-19, 2018, 8 pages, Kyoto, Japan.

Ajjad Abbasi, et al., "Modeling Teacher-Student Techniques in Deep Neural Networks for Knowledge Distillation," Computer Science, 2020 International Conference on Machine Vision and Image Processing (MVTP), 2020, 6 pp.

Al-Haj Baddar, "Finding Better Sorting Networks," Dissertation to Kent State University for PhD, May 2009, 86 pages.

Alesawy et al., Elliptic Curve Diffie-Hellman Random Keys Using Artificial Neural Network and Genetic Algorithm for Secure Data over Private Cloud, Inform. Technol. J., 15 (3): 77-83, 2016 (thru ResearchGate); Total pages: 9 (Year: 2016).

Alex Castrounis, Innoarchtech, "Production vs. Development AI and Machine Learning," published by O'Reilly Media, Copyright InnoArchiTech LLC 2020, 24 pages.

Alex Castrounis, Innoarchtech, "Advanced Analytics Packages, Frameworks, and Platforms," 29 pages, published by O'Reilly Media, Copyright InnoArchiTech LLC 2020.

Alex Castrounis, Innoarchtech, "Python vs. R for AI, Machine Learning, and Data Science," published by O'Reilly Media, Copyright InnoArchiTech LLC 2020, 27 pages.

Anooj, "Clinical decision support system: Risk level prediction of heart disease using weighted fuzzy rules", 2012 (Year: 2012). 14 pages.

Ares "A soft computing framework for classifying time series based on fuzzy sets of events", 2015 (Year: 2015). 20 pages.

Atin Sood, et al., "NEUNETS: An Automated Synthesis Engine For Neural Network Design," arXiv: 1901.06261vl, Jan. 17, 2019, 14 pp.

AU 2010241594—Examination Report dated Oct. 8, 2013, 3 pages.

AU 2010241597—Examination Report dated Nov. 4, 2013, 4 pages.

(56) References Cited

OTHER PUBLICATIONS

Barret Zoph, et al, "Neural Architecture Search With Reinforcement Learning," arXiv: 1611.01578v2, Feb. 15, 2017, 16 pp.
Berg "Fuzzy Classification Using Probability-Based Rule Weighting", IEEE, 2002 (Year: 2002). 6 pages.
Bergstra, et al., (2013), "Hyperopt: A Python Library for Optimizing the Hyperparameters of Machine Learning Algorithms," Proceedings of the 12th Python in Science Conference (SCIPY 2013).
Bilen et al. "Integrated Perception with Recurrent Multi-Task Neural Networks", NIPS, 2016, pp. 9.
Bilen, et al.,"Integrated perception with Reccurrent Multi-Task Neural Networks," NIPS 2016 ,9 pp.
Bredeche et al., "On-Line , On-Board Evolution of Robot Controllers", Artifical Evolution: 9th International Conference, Evolution Artificielle , EA, Strasbourg, France, vol. 5975, (20090000), pp. 110-121, URL: https://dl.acm.org/citation.cfm?id=1883723.1883738, (Mar. 15, 2019), XP019146179.
Bredeche, Nicolas, et al., "On-line, on-board evolution of robot controllers," International Conference on Artificial Evolution, Springer, Berlin, Heidelberg, 13 pages, 2009.
Canadian Examination Report issued in App. No. CA3129731, dated Oct. 24, 2022, 4 pages.
Caruana, R. Multitask learning. In Learning to learn, pp. 95-133. Springer US, 1998, (Year: 1998).
Chenglin Yang, et al., "Snapshot Distillation: Teacher-Student Optimization in One Generation," arXiv: 1812.00123vl, Dec. 1, 2018, 10 pp.
Cruz-Ramirez et al, 2011, "Selecting the Best Artificial Neural Network Model from a Multi-Objective Differential Evolution Pareto Front" (Year: 2011).
Cruz-Ramirez, 2010, "Memetic pareto differential evolutionary artificial neural networks to determine growth multi-classes in predictive microbiology" (Year: 2010).
Cui et al, Oct. 2018, "Evolutionary Stochastic Gradient Descent for Optimization of Deep Neural Networks" (Year: 2018).
Deb, et al., "A fast and elitist multiobjective genetic algorithm: NSGA-II," IEEE Transactions on Evolutionary Computation, 6(2), 2002, pp. 182-197.
Derrick Mwiti, "Research Guide: Model Distillation Techniques For Deep Learning" [online], Nov. 20, 2019 [retrieved on Oct. 5, 2020], 17 pp., Retrieved From the Internet: https://heartbeat.fritz.ai/research-guide-model-distillation-techniques-for-deep-learmng-4al00801c0eb.
Devin, Coline, et al., "Learning Modular Neural Network Policies For Multi-Task and Multi-Robot Transfer," arXiv: 1609.07088vl, Sep. 22, 2016, 8 pp.
Di Gao, et al., "Private Knowledge Transfer via Model Distillation with Generative Adversarial Networks," arXiv: 2004.0463lvl, Apr. 5, 2020, 8 pp.
Dong, "Multi-Task Learning for Multiple Language Translation," In Proc. of ACL, pp. 1723-1732, 2015.
E. Meyerson and R. Miikkulainen, "Beyond Shared Hierarchies: Deep Multitask Learning Through Soft Layer Ordering," ICLR, 14 pages, 2018.
Esparcia-Alcazar et al. "Evolving Recurrent Neural Network Architectures by Genetic Programming", 1997, pp. 6, https://citeseerx.ist.psu.edu/viewdoc/download?doi=10.1.1.40.226&rep=rep1&type=pdf.
Fernando et al., "Pathnet: Evolution channels gradient descent in super neural networks," arXiv preprint arXiv:1701.08734 (2017), 16 pages.
Francon et al., "Effective Reinforcement Learning through Evolutionary Surrogate-Assisted Prescription", ACM, Jul. 12, 2020, retrieved on [Nov. 10, 2022]. Retrieved from the internet <URL: https://dl.acm.org/doi/pdf/10.1145/3377930.3389842>.
Freitas, A. "A review of evolutionary algorithms for data mining." Soft Computing for Knowledge Discovery and Data Mining. Springer US, 2008. 79-111.
Galea, "Iterative vs Simultaneous Fuzzy Rule Induction", IEEE, 2005 (Year: 2005). 6 pages.
Garcia-Pedrajas et al., "COVNET: A Cooperative Coevolutionary Model for Evolving Artificial Neural Networks", IEEE Transactions on Neural Networks, vol. 14, No. 3, (2003). (Year: 2003) 22 pages.
Garcia-Pedrajas, et al., "Cooperative Coevolution of Artificial Neural Network Ensembles For Pattern Classification," IEEE Transactions on Evolutionary Computation, vol. 9, No. 3, 32 pages,Jun. 3, 2005.
Garcia-Pedrajas, et al., "Cooperative-Coevolution-of-Artificial-Neural-Networks", 2005, 32 pages.
Garciarena et al., Jul. 2018, "Evolved GANs for generating Pareto set approximations" (Year: 2018).
Gaurav Kumar Nayak, et al., "Zero-Shot Knowledge Distillation in Deep Networks," arXiv: 1905.08114vl, May 20, 2019, 17 pp.
Golovin, e tal., "Google Vizier: A Service for Black-Box Optimization," Proceedings of the 23rd ACM SIGKDD International Conference on Knowledge Discovery and Data Mining, pp. 1487-1495, 2017.
Gomes et al., "Devising Effective Novelty Search Algorithms: A Comprehensive Empirical Study," Madrid, Spain, Copyright Jul. 11-15, 2015, ACM, 8 pages.
Gomes et al., "Evolution of Swarm Robotics Systems with Novelty Search," published in Swarm Intelligence, vol. 7, Issue 2, ANTS Special Issue, Copyright Sep. 2013, pp. 115-144.
U.S. Appl. No. 13/945,630—Response to Final Office Action dated Aug. 4, 2015 filed Nov. 4, 2015, 12 pages.
U.S. Appl. No. 14/539,908—Response to Office Action dated Oct. 1, 2015 filed Feb. 1, 2016, 18 pages.
U.S. Appl. No. 14/595,991—Office Action dated May 10, 2017, 32 pages.
U.S. Appl. No. 15/794,905—Non Provisional Application filed Oct. 26, 2017, 60 pages.
U.S. Appl. No. 15/794,913—Non-Provisional Application filed Oct. 28, 2017, 73 pages.
Utech, J., et al., "An evolutionary algorithm for drawing directed graphs," Proc. of the Int. Conf. on Imaging Science, Systems and Technology, 8 pages,1998.
Valsalam, V.K., et al., "Using Symmetry and Evolutionary Search to Minimize Sorting Networks," Journal of Machine Learning Research 14, The University of Texas at Austin, Department of Computer Science, Copyright Sep. 2013, pp. 303-331.
Wissner-Gross, et al., "Causal Entropic Forces," Physical Review Letters, PRL 110.168702, American Physical Society, Apr. 19, 2013, 5 pages.
Xu, et al., "Inference of Genetic Regulatory Networks With Recurrent Neural Network Models Using Particle Swarm Optimization," Missouri University of Science and Technology, Oct. 2017, 36 pages, [retrieved on Feb. 14, 2019], Retrieved from the Internet: http://scholarsmine.mst.edu/cgi/viewcontent.cgi?article=1751&context=ele_comeng_facwork.
Yang et al., "Deep multi-task representation learning: A tensor factorisation approach," arXiv preprint arXiv: 1605.06391 (2016), 12 pages.
Yang Fan, et al., "Learning to Teach," ICLR 2018, arXiv: 1805.03643vl, May 9, 2018, 16 pp.
Yin et al., "ABCNN: Attention-Based Convolutional Neural Network for Modeling Sentence Pairs", Transactions of the Association for Computational Linguistics, (Dec. 16, 2015), vol. 4, pp. 259-272, XP081355040.
Zhang, et al., "Evolutionary Computation Meets Machine Learning: A Survey," IEEE Computational Intelligence Magazine, vol. 6, No. 4, DOI 10.1109/MCI.2011.942584, 2011.
Zhang, Loy, "Facial Landmark Detection by Deep Multi-Task Learning," In Proceedings of ECCV'14, 2014, 15 pages.
Yao & Islam, 2008, "Evolving Artificial Neural Network Ensembles" (Year: 2008).
Alois Pourchot et al. , "CEM-RL: Combining evolutionary and gradient-based methods for policy search", arXiv preprint arXiv:1810.01222v3, Oct. 2, 2018. 19 pages.
Open Ai: "Deep Deterministic Policy Gradient—Spinning Up documentation", Nov. 12, 2018, URL: https://web.archive.org/web/20181112044227/https://spinningup.openai.com/en/latest/algorithms/ddpg.html [retrieved on Feb. 15, 2023], 7 pages.

(56) References Cited

OTHER PUBLICATIONS

Tobias Peter: "Using Deep Learning as a surrogate model in Multi-objective Evolutionary Algorithms", Jan. 1, 2018, URL:https://www.ci.ovgu.de/is_media/Master+und+Bachelor_Arbeiten/MasterThesis_TobiasPeter-download-p-4614.pdf [retrieved on Feb. 14, 2023], 115 pages.
Extended European Search Report issued in App. No. EP20778409.1 dated Feb. 27, 2023, 11 pages.

\* cited by examiner

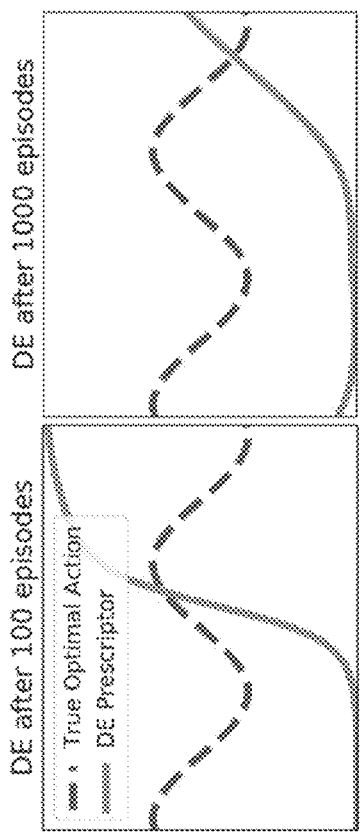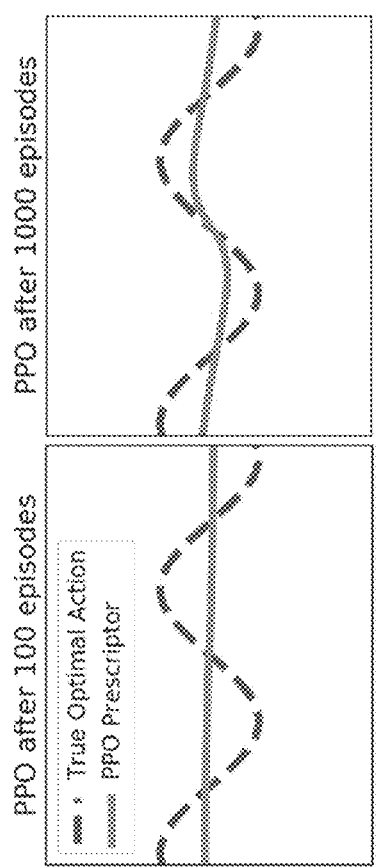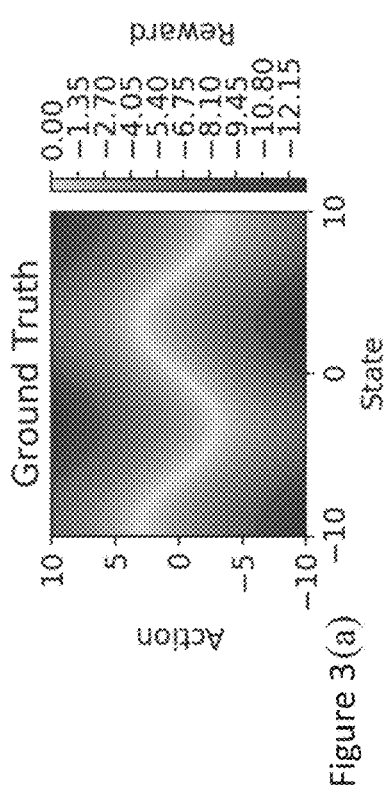
Figure 3(a)
Figure 3(b)
Figure 3(c)

PROCESS AND SYSTEM INCLUDING AN OPTIMIZATION ENGINE WITH EVOLUTIONARY SURROGATE-ASSISTED PRESCRIPTIONS

CROSS-REFERENCE TO RELATED APPLICATIONS

The present application claims the benefit of priority to U.S. Provisional Patent Application No. 62/824,909, entitled "OPTIMIZATION ENGINE WITH EVOLUTIONARY SURROGATE-ASSISTED PRESCRIPTIONS" which was filed on Mar. 27, 2019 and is incorporated herein by reference in its entirety.

Additionally, one skilled in the art appreciates the scope of the existing art which is assumed to be part of the present disclosure for purposes of supporting various concepts underlying the embodiments described herein. By way of particular example only, prior publications, including academic papers, patents and published patent applications listing one or more of the inventors herein are considered to be within the skill of the art and constitute supporting documentation for the embodiments discussed herein.

FIELD OF THE TECHNOLOGY

The technology disclosed relates generally to using evolutionary computation to optimize decision making strategies. More particularly, surrogate predictor model is trained, e.g., with historical data, and a prescriptor model, decision maker, is evolved against the surrogate predictor model.

BACKGROUND

Many organizations in business, government, education, and health-care now collect significant data about their operations. Such data is transforming decision making in organizations: It is now possible to use machine learning techniques to build predictive models of behaviors of customers, consumers, students, and competitors, and, in principle, make better decisions, i.e. those that lead to more desirable outcomes. However, while prediction is necessary, it is only part of the process. Predictive models do not specify what the optimal decisions actually are. To find a good decision strategy, different approaches are needed.

The main challenge is that optimal strategies are not known, so standard gradient-based machine learning approaches cannot be used. The domains are only partially observable, and decision variables and outcomes often interact nonlinearly: For instance, allocating marketing resources to multiple channels may have a nonlinear cumulative effect, or nutrition and exercise may interact to leverage or undermine the effect of medication in treating an illness. Such interactions make it difficult to utilize linear programming and other traditional optimization approaches from operations research. A discussion regarding the deficiencies of the prior art process can be found in Creative AI Through Evolutionary Computation by Risto Miikkulainen arXiv: 1901.03775v2 (22 Feb. 2020) the contents of which is incorporated herein by reference.

Instead, good decision strategies need to be found using search, i.e., by generating strategies, evaluating them, and generating new, hopefully better strategies based on the outcomes. In many domains such search cannot be done in the domain itself. For instance, testing an ineffective marketing strategy or medical treatment could be prohibitively costly. However, given that historical data about past decisions and their outcomes exist, it is possible to do the search using a predictive model as a surrogate to evaluate them. Once good decision strategies have been found using the surrogate, they are tested in the real world.

Even with the surrogate, the problem of finding effective decision strategies is still challenging. Nonlinear interactions may result in deceptive search landscapes, where progress towards good solutions cannot be made through incremental improvement and thus discovering them requires large, simultaneous changes to multiple variables. Decision strategies often require balancing multiple objectives, such as performance and cost, and in practice, generating a number of different trade-offs between them is needed. Consequently, search methods such as reinforcement learning (RL), where a solution is gradually improved through local exploration, do not lend themselves well to searching solution strategies either. Further, the number of variables can be very large, e.g. thousands or even millions as in some manufacturing and logistics problems, making methods such as Kriging and Bayesian optimization ineffective. Moreover, the solution is not a single point but a strategy, i.e. a function that maps input situations to optimal decisions, exacerbating the scale-up problem further.

A first exemplary RL solution which has been proposed in the existing art is model-based RL which aims to build a transition model, embodying the system's dynamics, that estimates the system's next state in time, given current state and actions. The transition model, which is learned as part of the RL process, allows for effective action selection to take place. While these models allow agents to leverage predictions of the future state of their environment, the model-based RL usually requires a prohibitive amount of data for building a reliable transition model while also training an agent and they can be computationally intractable for all but the lowest dimensional domains. Recent descriptions of exemplary model-based RL solutions can be found in at least the following references: Deisenroth, M. and Rasmussen, C. E. 2011. PILCO: A model-based and data-efficient approach to policy search. In Proceedings of the 28th International Conference on Machine Learning (ICML) (ICML'11). 465-472; Ha, D. and Schmidhuber, J. 2018. Recurrent World Models Facilitate Policy Evolution. In Advances in Neural Information Processing Systems 32 (NIPS'18), Curran Associates Inc., Red Hook, NY, USA, 2455-2467; Wahlstrom, N., Schon, T. B., and Deisenroth, M. P. 2015. From pixels to torques: Policy learning with deep dynamical models. arXiv preprint arXiv:1502.02251 (2015), the contents of which are known to those skilled in the art and incorporated herein by reference.

A second exemplary RL solution which has been discussed in the existing art is model free RL. As a representative model-free off-policy method, Deep Q-Networks (DQN) solves the sample efficiency issue by modeling future rewards using action values, also known as Q values. The Q-network is learned based on a replay buffer that collects training data from real-world interactions. Advanced techniques such as double Q-learning and dueling network architectures makes DQN competitive in challenging problems. Recent descriptions of exemplary model free RL solutions can be found in at least the following references: Mnih, V., Kavukcuoglu, K., Silver, D., Rusu, A. A., Veness, J., Bellemare, M. G., Graves, A., Riedmiller, M., Fidjeland, A. K., Ostrovski, G., and others, Human-level control through deep reinforcement learning. Nature 518, 7540 (2015), 529-533; Hasselt, H. V. 2010. Double Q-learning. In Advances in Neural Information Processing Systems 23, J. D. Lafferty, C. K. I. Williams, J. Shawe-Taylor, R. S.

Zemel, and A. Culotta (Eds.). Curran Associates, Inc., 2613-2621; and Wang, Z., Schaul, T., Hessel, M., Van Hasselt, H., Lanctot, M., and De Freitas, Dueling Network Architectures for Deep Reinforcement Learning, In Proceedings of the 33rd International Conference on International Conference on Machine Learning (ICML) (ICML'16), Vol. 48. JMLR.org, 1995-2003, the contents of which are known to those skilled in the art and incorporated herein by reference.

Third, on-policy model-free techniques, policy gradient approaches (sometimes referred to as deep RL) leverage developments in deep neural networks to provide a general RL solution. For example, Asynchronous Advantage Actor-Critic (A3C) in particular builds policy critics through an advantage function, which considers both action and state values. And Proximal Policy Optimization (PPO) further makes actor-critic methods more robust with a clipped surrogate objective. Unfortunately, policy gradient techniques are typically quite sensitive to hyperparameter settings, and require overwhelming numbers of samples, due, among other reasons, to the need to train a policy neural network. Descriptions of existing A3C and PPO approaches may be found in: Mnih, V., Badia, A. P., Mirza, M., Graves, A., Lillicrap, T., Harley, T., Silver, D., and Kavukcuoglu, Asynchronous methods for deep reinforcement learning, In Proceedings of the 33rd International Conference on International Conference on Machine Learning (ICML) (ICML'16). 1928-1937 and Schulman, J., Wolski, F., Dhariwal, P., Radford, A., and Klimov, O., Proximal Policy Optimization Algorithms. CoRR abs/1707.06347 (2017), the contents of which are known to those skilled in the art and incorporated herein by reference.

And there have been descriptions in the existing art of using evolutionary approaches with RL. For example, the evolution of policy gradients has been described in the following recent articles: Houthooft, R., Chen, Y., Isola, P., Stadie, B., Wolski, F., Ho, O. J., and Abbeel, P., Evolved policy gradients, In Advances in Neural Information Processing Systems 31, Curran Associates, Inc., 5400-5409 (2018); Khadka et al, Evolution-Guided Policy Gradient in Reinforcement Learning, 32nd Conference on Neural Information Processing Systems (NeurIPS 2018); and Pourchot, et al., CEM-RL: Combining Evolutionary and Gradient-Based Methods for Policy Search, ICLR 2019.

Finally, evolutionary techniques have been used to directly discover policies. But such direct policy evolution can only leverage samples from the real-world, which is costly and risky since many evaluations have to take place in low-performing areas of the policy space. This issue in evolutionary optimization led to the development of surrogate-assisted evolution techniques and surrogate methods have been applied to a wide range of domains, ranging from turbomachinery blade optimization to protein design as is known to those skilled in the relevant art.

Though today's AI applications handle analytics well, the resulting decision-making is still done manually or by using rigid algorithms designed to optimize one or more outcomes. Insights are provided, but the choice of which action to take is not always obvious. The following real-world example highlights the limits of decision-making with current AI. A company has determined, through the use of advanced modeling and projections, that the company's business is at risk of missing its revenue targets in six months. What should be done? Cut costs? Sell at a discount or renegotiate supplier prices? Retarget sales? Or maybe the right choice is to invest in growth or efficiency. Which combination of these choices is best? Given one of these choices, what is the best way to implement it?

Simple extensions to reporting, such as predictive analytics, produce coarse grain advice. Even if your system determines your costs are high, it's still up to you, the Company, to decide what to do about it. Businesses want to maximize revenue, maximize sales and minimize cost and risk, but these objectives are often not aligned, and focusing on one usually comes at the expense of another. Reducing costs by too much can mean losing valuable talent, and over-emphasis on sales can lead to unsustainably low prices. Neither of those options is viable. The best decisions are made when these factors and objectives are correctly balanced. Further, current AI systems have a hard time effectively dealing with changing conditions. Today, decision-making models often become obsolete more quickly than we expect, with rapid changes in habits, culture, fashion, the economy, technology disruption, and legal and regulatory changes. Models based on historical data also cannot withstand what are often called "black swan" events, i.e., unpredictable events that are beyond what is normally expected of a situation and have potentially severe consequences. Even prior art systems that learn approximately a million permutations are still not agile enough to respond to unexpected states that have not been captured in the training set. They fail miserably if rules are changed.

Accordingly, there remains a need in the art for an approach that can be generalized across many contexts to evolve better policies in a human-like fashion. Such a system would need to effectively draw conclusions by continuously forming and updating mental models of the world, creating hypothetical contexts, and then mentally forecasting the implications of different actions based on historical knowledge of previous outcomes and an understanding of current conditions and how they might change over time. The system would then apply the chosen strategy, observe the results, and then modify and improve the models of the real world.

SUMMARY OF EMBODIMENTS

In a first embodiment, a computer-implemented process for developing an optimized prescriptor model for determining optimal decision policy outcomes includes: building a predictor surrogate model historical training data to predict an outcome; feeding the predictor surrogate model in an evolutionary algorithm framework to train a prescriptor model using evolution over multiple generations, wherein subsequent generations are evolved based on results of prior generations until an optimized prescriptor model is determined.

In a second embodiment, a computer-implemented process for finding a decision policy that optimizes a set of outcomes to solve a known policy problem, includes:
  i. training a predictor model based on historical training data including context information (C), actions (A) performed in an included context, and historical C, A, outcome (O) data sets (C, A, O);
  ii. evolving prescriptor models with the trained predictor model as a surrogate over a predetermined number of generations;
  iii. applying a determined elite evolved prescriptor model at a predetermined interval to a known policy problem to generate new decision policy data in the format (C, A, O);
  iv. collecting the new decision policy data (C, A, O) and adding the new decision policy data (C, A, O) to the historical training data; and v. repeating i. through iv. until a predetermined convergence metric is met.

In a third embodiment computer-implemented process for discovering optimal prescriptor agents in a reinforced learning process in a predetermined domain, comprising:
i. applying pre-selected prescriptor models in the predetermined domain;
ii. collecting Q value data for each time step for each pre-selected prescriptor model, wherein a Q value is a reward vector for the step;
iii. training a predictor model based on data collected in ii.;
iv. evolving prescriptor models with the trained predictor model as a surrogate over a predetermined number of generations;
v. repeating i. through iv. until a predetermined convergence metric is met to discover the optimal prescriptor agents in the predetermined domain.

BRIEF SUMMARY OF FIGURES

The invention will be described with respect to specific embodiments thereof, and reference will be made to the drawings, in which:

FIGS. 3(a)-3(d) provide visualizations of the behavior of ESP in a synthetic function approximation domain in accordance with an embodiment herein;

DETAILED DESCRIPTION

To empower decision makers with the right information at the right time warrants design and execution of the right set of interventions based on the data and inputs from various sources. In an era of Artificial Intelligence (AI) and now, Evolutionary AI, it is imperative that businesses utilize these enablers to achieve the stated objective in a short span of time. The present embodiments use evolutionary AI. Evolutionary AI is a general name for a group of problem-solving techniques inspired by the theory of biological evolution, such as genetic inheritance, natural selection, recombination, mutation and survival of the fittest. Techniques in this field are used on problems that have too many variables for traditional algorithms to consider and where the approach to solving a particular problem is not well understood or requires creativity. One skilled in the art is aware of the numerous descriptions in the literature addressing evolutionary AI in its many forms and variations.

There is now significant historical data available on decision making in organizations, consisting of the decision problem, what decisions were made, and how desirable the outcomes were. Using this historical data, it is possible to learn a surrogate model, and with that model, evolve a decision strategy that optimizes the outcomes. The present embodiments introduce a general such approach, called Evolutionary Surrogate-Assisted Prescription, or ESP. The surrogate is, for example, a random forest or a neural network trained with gradient descent, and the strategy is a neural network that is evolved to maximize the predictions of the surrogate model. As discussed further below, ESP can be extended to sequential decision-making tasks, which makes it possible to evaluate the framework in reinforcement learning (RL) benchmarks. Because the majority of evaluations are done on the surrogate, ESP is more sample efficient, has lower variance, and lower regret than standard RL approaches. Surprisingly, ESP solutions are also better because both the surrogate and the strategy network regularize the decision making behavior. ESP thus introduces a foundation to decision optimization in real-world problems.

Through the use of an ESP service within an optimization engine, business outcomes may be impacted by enhancing decision processes. The Learning Evolutionary Algorithm Framework (LEAF) AI-enables manual decision processes using a prescriptive AI system to create and iteratively enhance recommendations, improving processes and achieving business goals in a principled AI-based manner.

Figure 1:
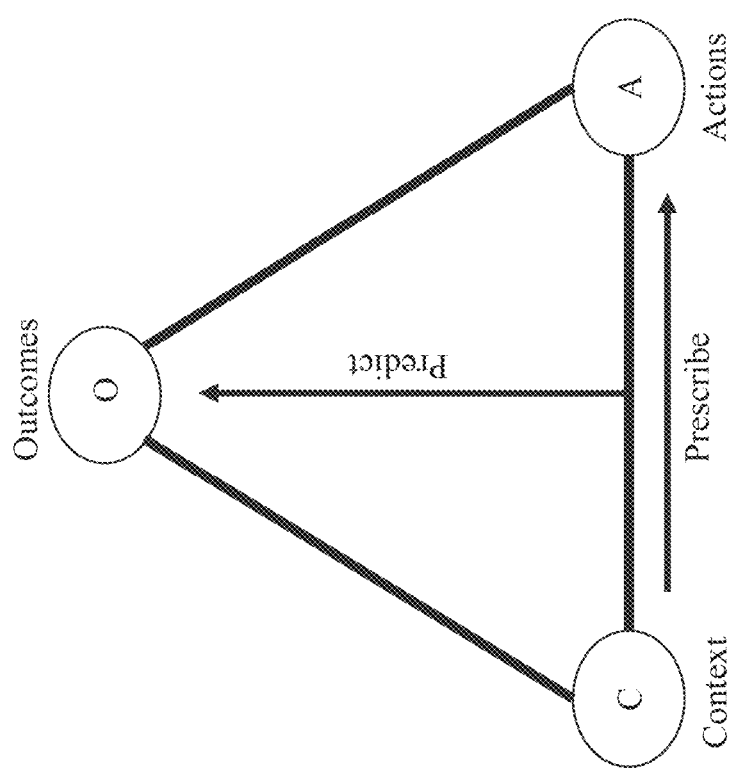
FIG. 1 is a generalized Evolutionary Surrogate-Assisted Prescription ("ESP") model in accordance with an embodiment herein.

At the base of how ESP works are the concepts of Context (C), Actions (A), and Outcomes (O) exemplified in the generalized ESP model shown in FIG. 1. The process starts with the building of a predictor surrogate model. The predictor can be any machine learning model trained with supervised methods, such as a random forest, a neural network or other models meeting the criteria known to those skilled in the art. The predictor is then used as a surrogate in order to evolve a prescriptor, i.e. a neural network implementing a decision policy that results in the best possible outcomes. The majority of evaluations are done on the surrogate, making the process highly sample-efficient and robust, and leading to decision policies that are regularized and therefore generalize well.

The goal of the ESP approach is to find a decision policy that optimizes a set of outcomes (FIG. 1). Given a set of possible contexts (or states) C and possible actions A, a decision policy D returns a set of actions A to be performed in each context C:

$$D(C)=A, \tag{1}$$

where $C \in \mathcal{C}$ and $A \in \mathcal{A}$. For each such (C, A) pair there is a set of outcomes O(C, A), i.e. the consequences of carrying out decision A in context C. For instance, the context might be a description of a patient, actions might be medications, and outcomes might be health, side effects, and costs. In the following, higher values of O are assumed to be better for simplicity.

Figure 2A:
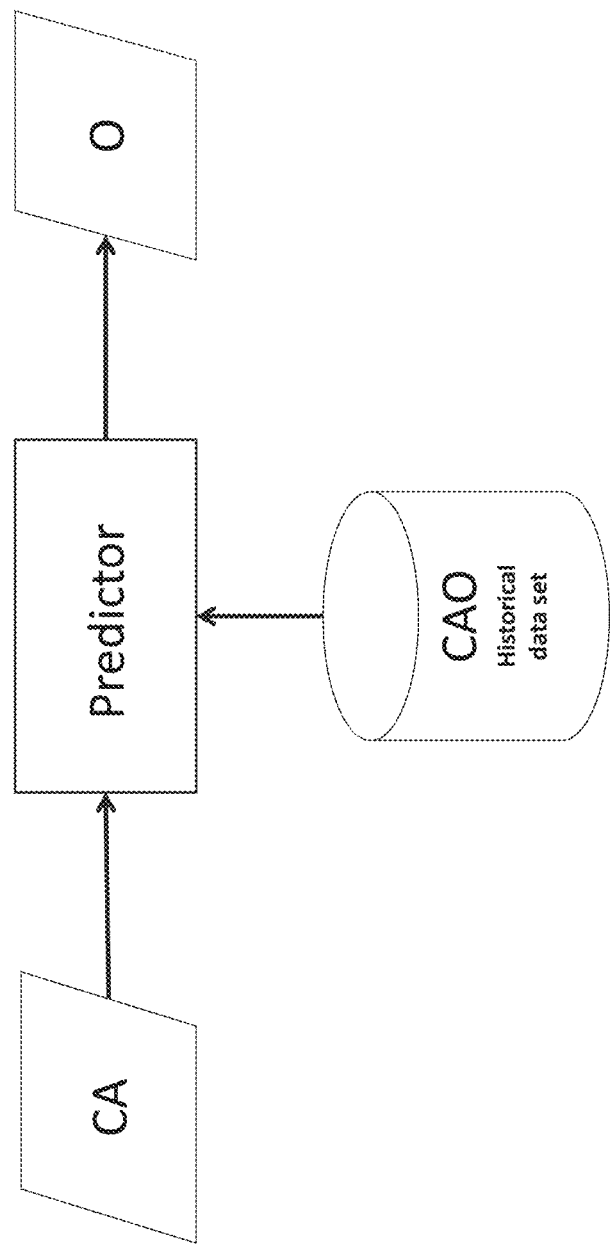
FIGS. 2(a)-2(d) are process flows and system schematics of the ESP algorithm and exemplary system components in accordance with an embodiment herein.

In ESP, two models are employed: a Predictor $P_d$, and a Prescriptor $P_s$. As shown in FIG. 2(a), the Predictor takes, as its input, context information (C), as well as actions (A) performed in that context, along with historical C, A, O data sets. The output of the Predictor is the resulting outcomes when the given actions are applied in the given context. The Predictor is therefore defined as $$P_d(C,A)=O', \tag{2}$$

such that $\Sigma j\ L(Ij,\ Oj')$ across all dimensions j of O is minimized. The function L can be any of the usual loss functions used in machine learning, such as cross-entropy or mean-squared-error, and the model $P_d$ itself can be any supervised machine learning model such as a neural network or a random forest.

Figure 2B:
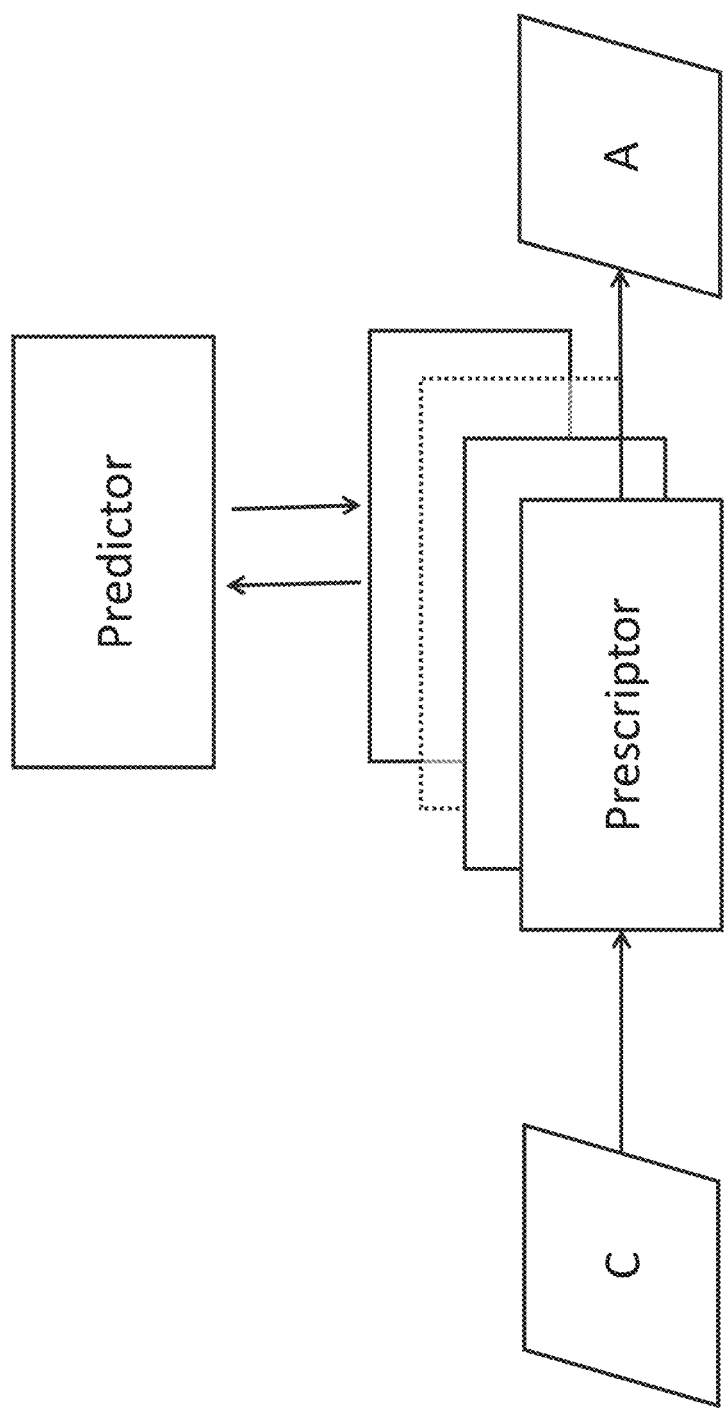

As shown in FIG. 2(b), the Prescriptor takes a given context as input, and outputs a set of actions:

$$P_s(C)=A, \quad (3)$$

such that $\Sigma i, j\ Oj'(Ci, Ai)$ over all possible contexts i is maximized. It thus approximates the optimal decision policy for the problem. Note that the optimal actions A are not known, and must therefore be found through search. The ESP algorithm then operates as an outer loop in a continuous learning and optimization process that constructs the predictor and prescriptor models as follows (FIG. 2c):

(1) Train a Predictor based on historical training data; (S1)
(2) Evolve Prescriptors with the Predictor as the surrogate; (S2)
(3) Apply the best Prescriptor in the real world; (S3)
(4) Collect the new data and add to the training set; (S4)
(5) Repeat until convergence. (S5)

As usual in evolutionary search, the process terminates when a satisfactory level of outcomes has been reached, or no more progress can be made. Note that in S1, if no historical decision data exists initially, a random Predictor can be used. Also note that not all data needs to be accumulated for training each iteration. In domains where the underlying relationships between variables might change over time, it might be advisable to selectively ignore samples from the older data as more data is added to the training set in S4. It is thus possible to bias the training set towards more recent experiences.

Figure 2C:
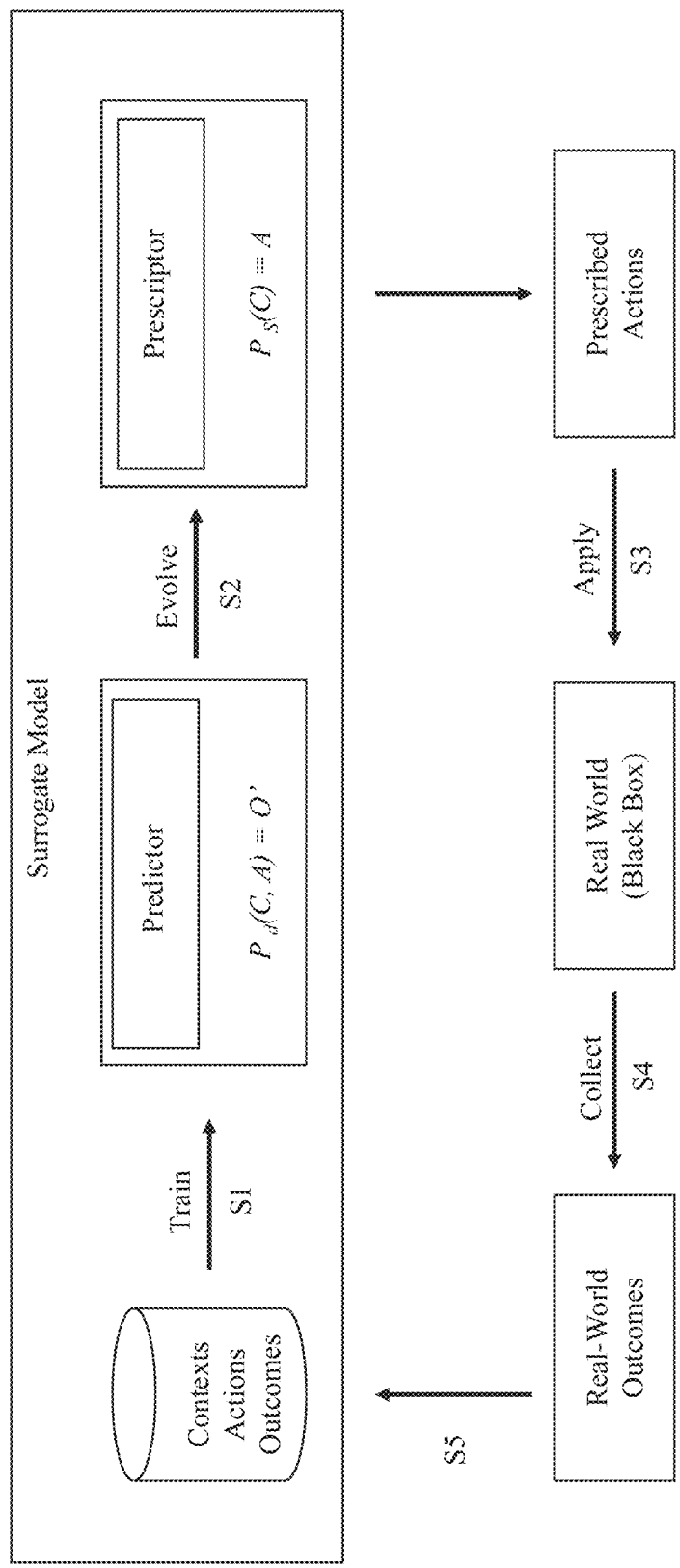
Figure 2D:
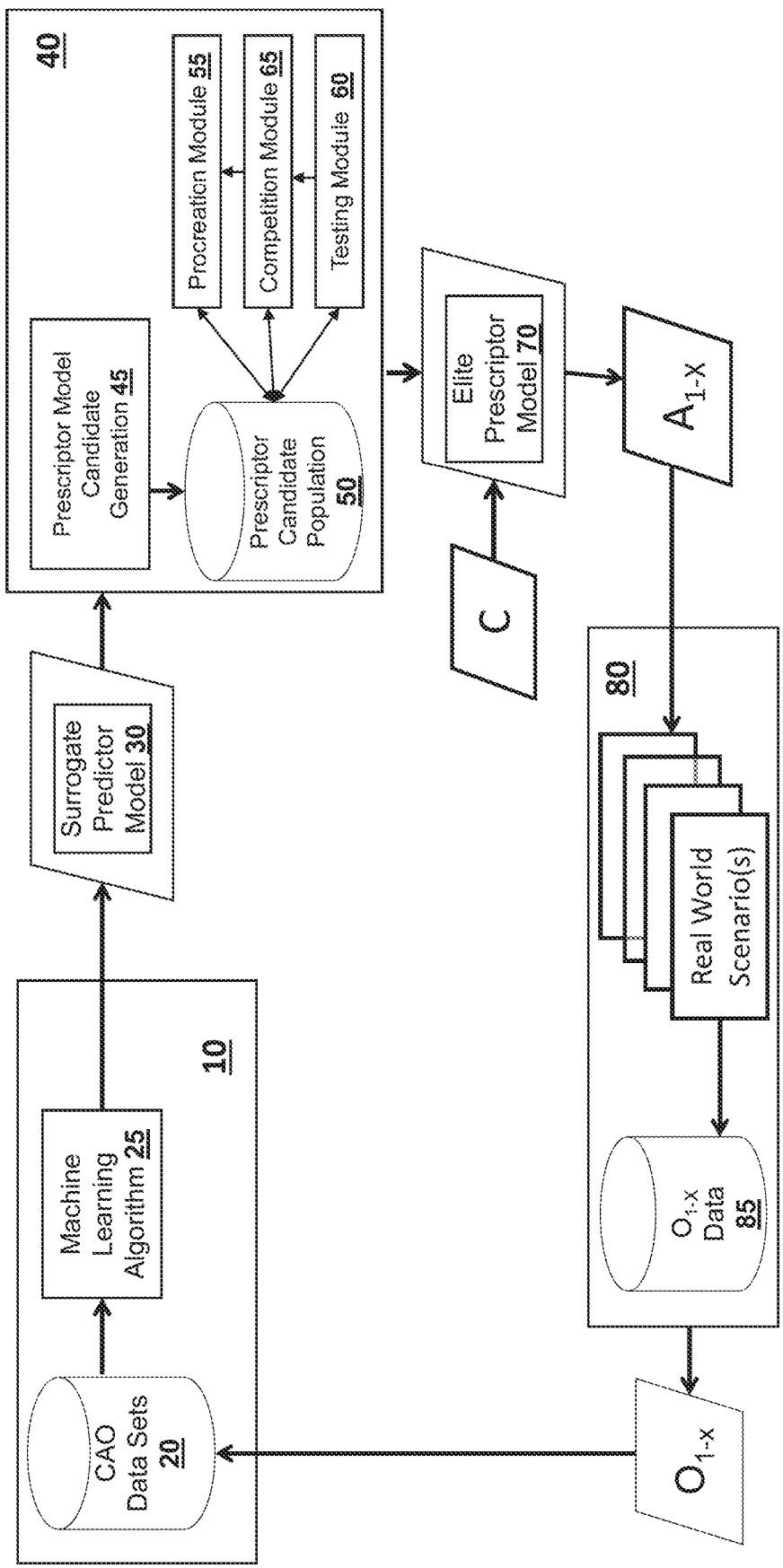

One skilled in the art will appreciate the myriad of system components, including one or more processing units and databases, and configurations which may be employed to implement the processes and subprocesses described herein. FIG. 2d is a schematic of an exemplary system. The overall exemplary system includes a surrogate predictor model generation subsystem 10 which includes at base, a database 20 for storing (C, A, O) training datasets, and at least one module for implementing the selected machine learning algorithm 25, which outputs a trained surrogate predictor model 30. The trained surrogate predictor model is used to evaluate fitness of evolved prescriptor model candidates as part of the evolution process implemented by the prescriptor evolution subsystem 40. The prescriptor evolution subsystem 40 includes a prescriptor model candidate generator 45 and a prescriptor candidate population database 50 which can be continually update in accordance with evolving candidates. The prescriptor candidates are evaluated for fitness against the surrogate predictor model 30 by testing module 60 and ranked or otherwise filtered and compared to one another in accordance with the requirements of a competition module 65. Elite prescriptor model(s) 70 are selected for application to real world scenarios by the real world application subsystem 80. A procreation module 55 is used to re-seed and update the prescriptor candidate population database 50 in accordance with known procreation processes. Finally, the outcomes from application of the elite prescriptor model 70 actions to real work scenarios are stored in outcome database 85 and shared with database 20 to update the (C, A, O) training data.

As is appreciated by those skilled in the art, additional modules and processors, servers and databases may be incorporated to perform different or additional tasks, including data processing/filtering/translation as required for different domains and data sources. Further, aspects of the overall system or subsystems may be performed by different entities. For example, the surrogate predictor model generation subsystem 10 and the prescriptor evolution subsystem 40 may be operated by a service provider and provided as a SaaS product, while the real world application subsystem 80 may be operated exclusively by a customer, thus protecting confidential business and other data. The following co-owned patent applications are incorporated herein by reference herein: U.S. patent application Ser. No. 16/424,686 entitled Systems And Methods For Providing Secure Evolution As A Service and U.S. patent application Ser. No. 16/502,439 entitled Systems And Methods For Providing Data-Driven Evolution Of Arbitrary Data Structures.

Building the predictor model is straightforward given a (C, A, O) dataset. The choice of algorithm depends on the domain, i.e., how much data there is, whether it is continuous or discrete, structured or unstructured. In the examples herein, random forests and neural networks will be demonstrated, but one skilled in the art will recognize that algorithm choice varies with domain and can select accordingly. The prescriptor model, in contrast, is built using neuroevolution in ESP. Neural networks can express complex nonlinear mappings naturally, and evolution is an efficient way to discover such mappings, and is naturally suited to optimize multiple objectives. Because it is evolved with the predictor, the prescriptor is not restricted by a finite training dataset, or limited opportunities to evaluate in the real world. Instead, the predictor serves as a fitness function, and it can be queried frequently and efficiently. In a multiobjective setting, ESP produces multiple prescriptors, selected from the Pareto front of the multiobjective neuroevolution run.

Applying the ESP framework to RL problems involves extending the contexts and actions to sequences. The prescriptor can be seen as an RL agent, taking the current context as input, and deciding what actions to perform in each time step. The output of the predictor, O', can be seen as the reward vector for that step, i.e. as Q values (with a given discount factor, such as 0.9, as in the experiments below). Evolution thus aims to maximize the predicted reward, or minimize the regret, throughout the sequence.

The outer loop of ESP changes slightly because in RL there is no dataset to train the predictor; instead, the data needs to be generated by applying the current prescriptors to the domain. An elite set of several good prescriptors are used in this role to create a more diverse training set. The initial training set is created randomly. The loop now is:

($1_{RL}$) Apply the elite Prescriptors in the actual domain;
($2_{RL}$) Collect Q values for each time step for each Prescriptor;
($3_{RL}$) Train a Predictor based on data collected in Step $2_{RL}$;
($4_{RL}$) Evolve Prescriptors with the Predictor as the surrogate;
($5_{RL}$) Repeat until convergence.

The evolution of Prescriptors continues in each iteration of this loop from where it left off in previous iteration. In addition, the system keeps track of the best Prescriptor so far, as evaluated in the actual domain, and makes sure it stays in the parent population during evolution. This process discovers good Prescriptor agents efficiently, as will be described in the experiments that follow.

Evolution, which herein refers to evolutionary artificial intelligence technology or evolutionary computation, is a population-based approach. That is, rather than modifying a single solution until it is in an acceptable state (e.g., back-propagating deep networks), the evolutionary computation process in its most general form: generates a population of candidate solutions (initially randomly or using a priori data where available); calculates the fitness of each candidate, removes less fit candidates from the population (e.g., candidate pool) and regenerates new candidate solutions by either randomly tweaking the fitter ones or treating fitter ones as parents and borrowing traits from them and generating new candidates. Thus, evolutionary computation generates a population of models that map a given context (C) to proposed actions (A), and rates the models based on how well they do on the outcomes (O) predicted by the predictor (Pa). Additional features, variations and applications of/to evolutionary computation are described in numerous publications known to those skilled in the art, including at least the following commonly assigned patents and patent applications which are incorporated herein by reference in their entireties: U.S. Pat. No. 8,909,570 entitled Data mining technique with experience-layered gene pool; U.S. Pat. No. 8,918,349 entitled Distributed network for performing complex algorithms; U.S. Pat. No. 8,977,581 entitled Data mining technique with diversity promotion; U.S. Pat. No. 9,002,759 entitled Data mining technique with maintenance of fitness history; U.S. Pat. No. 10,268,953 entitled Data mining technique with maintenance of ancestry counts; U.S. Pat. No. 10,430,709 entitled Data mining technique with distributed novelty search. The above-identified list is not exhaustive.

To test the efficacy of ESP, it was evaluated in three domains: Function approximation, where its behavior could be visualized concretely; Cart-pole control where its performance could be compared to standard RL methods in a standard RL benchmark task; and Flappy Bird, where the regularization effect of the surrogate could be demonstrated most clearly.

The neuroevolution algorithm for discovering Prescriptors evolves weights of neural networks with fixed topologies. Unless otherwise specified, all experiments use the following default setup for evolution: candidates have a single hidden layer with bias and tan h activation; the initial population uses orthogonal initialization of layer weights with a mean of 0 and a standard deviation of 1; the population size is 100; the top 10% of the population is carried over as elites; parents are selected by tournament selection of the top 20% of candidates; recombination is performed by uniform crossover at the weight-level; there is a 10% probability of multi-plying each weight by a mutation factor, where mutation factors are drawn from N (1, 0.1).

The behavior of ESP can be visualized in a synthetic function approximation domain. The domain also allows comparing ESP to direct evolution in the domain, as well as to PPO, and visualizing their differences.

The domain has a one-dimensional context C and a one-dimensional action A, with outcome O given by the function $$O = -\left|A - 3\sin\frac{C}{2}\right|.$$

The optimal action for each context lies on a periodic curve, which captures complexity that can arise from periodic variables such as time of day or time of year. The outcome of each action decreases linearly as the action moves away from the optimal action. Episodes in this domain consist of single action in [−10, 10], which is taken in a context drawn uniformly over [−10, 10]. The full domain ground truth is shown in FIG. 3(a).

ESP begins by taking ten random actions. There-after, every iteration, ESP trains a neural network with two hidden layers of size 64 and tan h activation for 2000 epochs using the Adam optimizer with default parameters to minimize MSE, and evolves Prescriptors for 20 generations against this Predictor. Then, the top Prescriptor is run in the real domain for a single episode. Prescriptors have a single hidden layer of size 32 with tan h activation; default parameters are used for evolution.

Direct Evolution (DE) was run as a baseline comparison for ESP. It consists of the exact same evolution process, except that it is run directly against the real function instead of the Predictor. That is, in each generation, all 100 candidates are evaluated on one episode from the real function.

PPO was run as an RL comparison since it is a state-of-the-art RL approach for continuous action spaces. During each iteration it was run for ten episodes since this setting was found to perform best during hyperparameter search. PPO defaults were used for the remaining hyperparameters. Descriptions of PPO which is known to those skilled in the art may be found in Schulman et al., Proximal Policy Optimization Algorithms, arXiv:1707.06347v2 (August, 2017), which is incorporated herein by reference in its entirety.

Ten independent runs were performed for each algorithm. The returned policy at any time for DE and ESP is the candidate with the highest fitness in the population; for PPO it is the learned policy run without stochastic exploration.

Figure 3D:
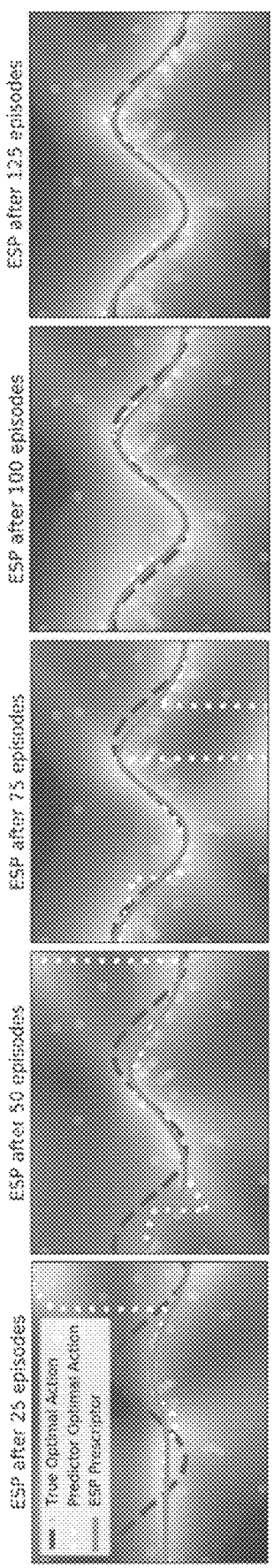

Snapshots of the convergence behavior for each method are shown in FIGS. 3(b)-3(d). After 1000 episodes, neither DE nor PPO converged near the optimal solution (FIGS. 3(b)-3(c)). On the other hand, per FIG. 3(d), ESP discovered the periodic nature of the problem within 50 episodes, and converged almost exactly to the optimal within 125 episodes. FIG. 3(d) illustrates ESP Prescriptor (orange) and Predictor (background) for several iterations. The translucent circles indicate the state-action pairs sampled so far, i.e., the samples on which the Predictor is trained. By 125 episodes, ESP has converged around the optimal Prescriptor, and the ESP Predictor has converged in the neighbor-hood of this optimum, showing how ESP can leverage Predictors over time to find good actions quickly. Note that the Prescriptor does not exactly match the actions the Predictor would suggest as optimal: the Prescriptor regularizes the Predictor's overfitting by implicitly ensembling the Predictors evolved over time.

The Predictor's predicted reward for each state-action pair is shown using the background colors in each snapshot of ESP. The rapid convergence of the Predictor highlights the sample efficiency of ESP, due to aggressive use of historical data (shown as translucent circles). Note, however, that the Predictor does not converge to the ground truth over the entire domain; it does so just in the neighborhood of the optimal Prescriptor. Thus, ESP avoids excessive costly exploration of low-quality actions once the structure of optimal actions has become clear.

Note also that the Prescriptor does not follow the optimal action suggested by the Predictor at every iteration exactly. Since it maps states directly to actions, the Prescriptor provides a smoothing regularization in action space that can overcome Predictor overfitting. Also, since the top ESP Prescriptors must survive across many different Predictors over time, ESP benefits from an implicit temporal ensembling, which further improves regularization.

Figure 4B:
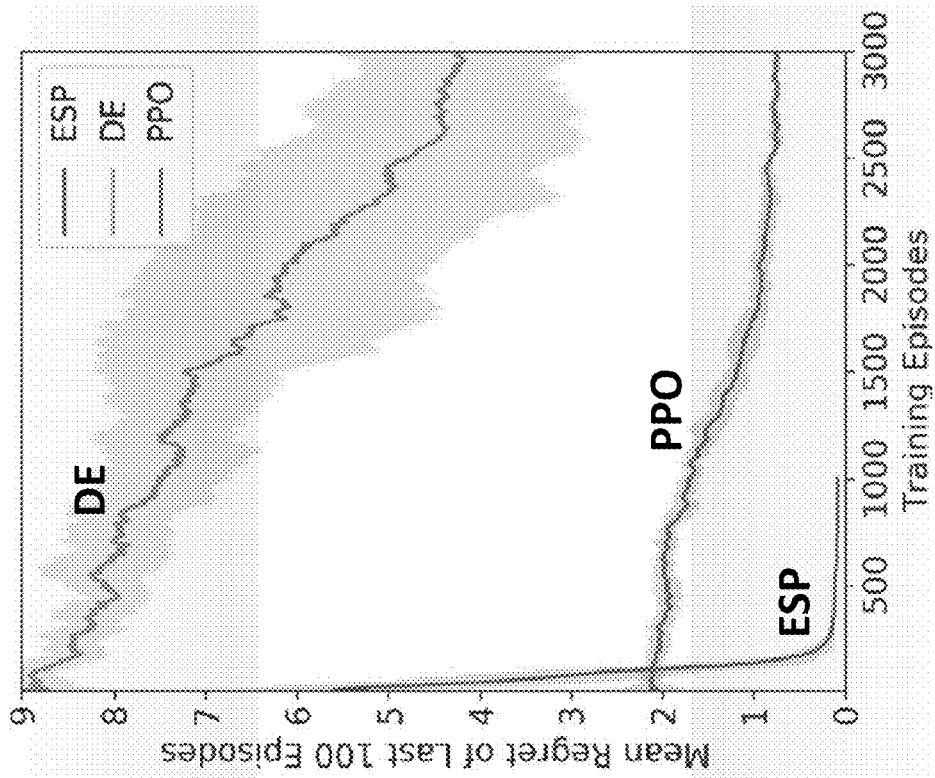
FIGS. 4(a)-4(b) provide exemplary visualizations of performance of ESP in the function approximation domain in accordance with an embodiment herein.
Figure 4A:
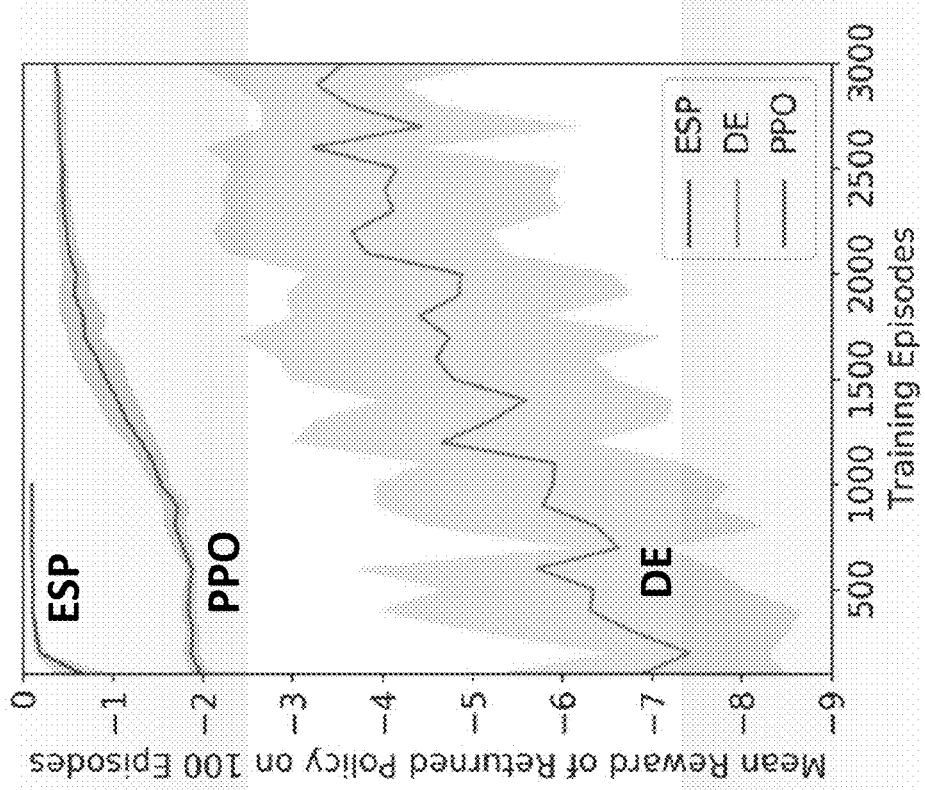

The numerical performance results in FIGS. 4(a) and 4(b) confirm the substantial advantage of ESP. The horizontal axis indicates the total number of real-world episodes used by training and the vertical axis the performance at that point. Ten independent runs were performed for each method. Solid lines represent the mean over 10 runs, and colored areas show the corresponding standard deviation. The true performance of the returned best agent converges substantially faster with ESP (FIG. 4(a)). And ESP also operates with much lower regret than DE or PPO, converging to very low regret behavior orders-of-magnitude faster than the other approaches (FIG. 4(b)). On both metrics, ESP converges orders-of-magnitude faster than the other approaches. In particular, after a few hundred episodes, ESP reaches a solution that is significantly better than any found by DE or PPO, even after 3,000 episodes. This result shows that, beyond being more sample efficient, by systematically exploiting historical data, ESP is able to find solutions that direct evolution or policy gradient search cannot. The standard deviation of ESP is small in both metrics, attesting to the reliability of the method.

Cart-pole experiments described below demonstrate ESP's performance compared to direct evolution and standard RL methods. The Cart-pole control domain is one of the standard RL benchmarks. In the popular CartPole-v0 implementation on the OpenAI Gym platform used in the experiments, there is a single pole on a cart that moves left and right depending on the force applied to it. A reward is given for each time step that the pole stays near vertical and the cart stays near the center of the track; otherwise the episode ends.

DE was run with a population size of 50 candidates. A candidate is a neural network with four inputs (observations), one hidden layer of 32 units with tan h activation, and two outputs (actions) with argmax activation functions. The fitness of each candidate is the average reward over five episodes in the game, where the maximum episode length is 200 time steps.

ESP runs similarly to DE, except that the fitness of each candidate is evaluated against the Predictor instead of the game. A Predictor is a standard multilayer perceptron neural network with six inputs (four observations and two actions), two hidden layers with 64 units each and tan h activation, and one output (the predicted discounted future reward) with tan h activation. It is trained for 1,000 epochs with the Adam optimizer with MSE loss and batch size of 256.

The first Predictor is trained on samples collected from five random agents playing five episodes each. Random agents choose a uniform random action at each time step. A sample corresponds to a time step in the game and comprises four observations, two actions, and the discounted future reward. Reward is +1 on each time step, except for the last one where it is adjusted to +2,000 in case of success, −2,000 in case of failure (i.e. 10× max time steps). The discount factor is set to 0.9. The reward value is then scaled to lie between −1 and 1.

In order to be evaluated against the Predictor, a Prescriptor candidate has to prescribe an action for each observation vector from the collected samples. The action is then concatenated with the observation vector and passed to the Predictor to get the predicted future reward. The fitness of the candidate is the average of the predicted future rewards.

Every five generations, data is collected from the game from the five elites, for five episodes each. The new data is aggregated into the training set and a new Predictor is trained. The generation's candidates are then evaluated on the new Predictor with the new training data. The top elite candidate is also evaluated for 100 episodes on the game for reporting purposes only. Evolution is stopped after 160 generations, which corresponds to 800 episodes played from the game, or once an elite receives an average reward of 200 on five episodes.

In addition to DE and ESP, two state-of-the-art RL methods were implemented for comparison: double DQN with dueling network architectures and actor-critic style PPO. The implementation and parametric setup of DQN and PPO were based on OpenAI Baselines. For PPO, the policy's update frequency was set to 20, which was found to be optimal during hyperparameter search. All other parametric setups of DQN and PPO utilized default setups as recommended in OpenAI Baselines.

Figures 5A, 5B:
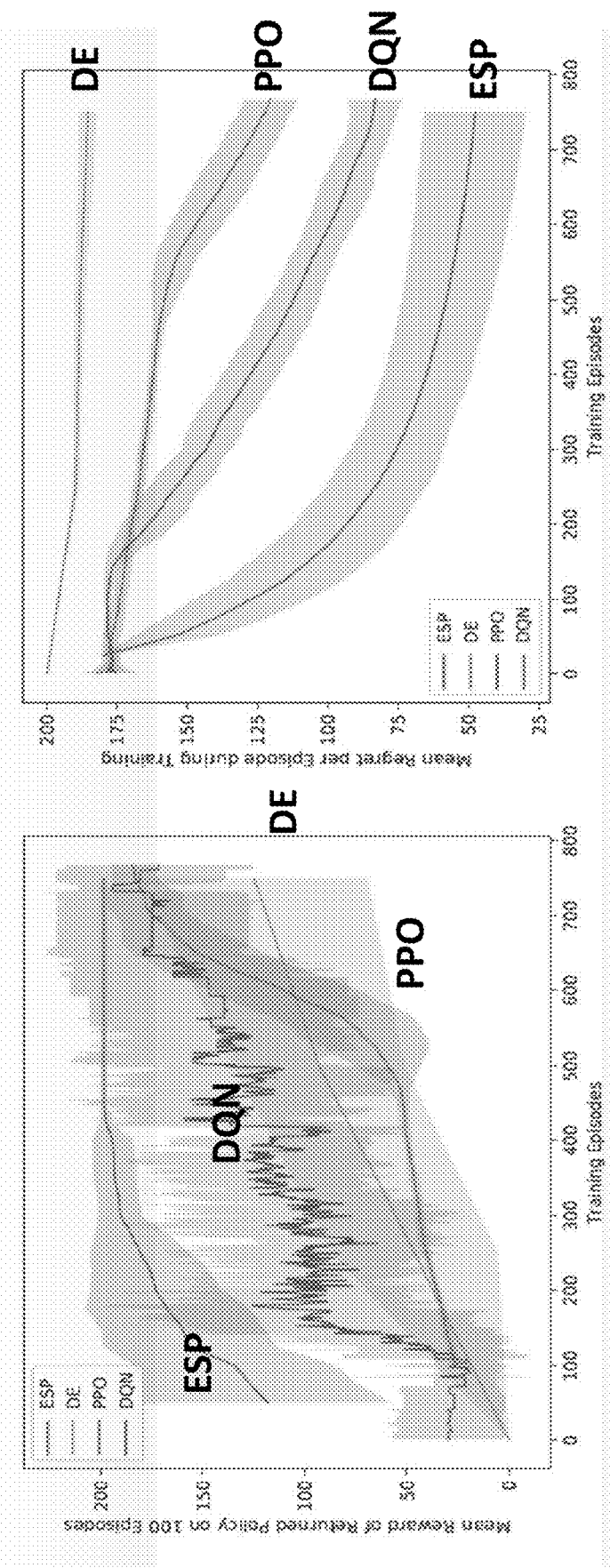
FIGS. 5(a)-5(b) provide exemplary visualizations of performance of ESP in the cart-pole domain in accordance with an embodiment herein.

FIG. 5(a) shows how the true performance of the best policy returned by ESP, DE, PPO, and DQN changes during the learning process in CartPole-v0. For ESP and DE, the elite candidate that has the best real-world fitness is selected as the best policy so far. For DQN and PPO, whenever the moving average reward of the past 100 episodes of training is increased, the best policy will be updated using the most recent policy. One hundred additional real-world episodes were used to evaluate the best policies (these evaluations are not part of the training).

ESP converges significantly faster than the other methods, implying better sample-efficiency during learning. Moreover, the variance of the true performance becomes significantly smaller for ESP after an early stage, while all other algorithms have high variances even during later stages of learning. This observation demonstrates that the solutions delivered by ESP are highly reliable.

FIG. 5(b) shows the average regret for training processes of all algorithms in CartPole-v0. ESP has significantly lower regret during the entire learning process, indicating not only lower costs but also better safety in real-world interactions.

Figure 6:
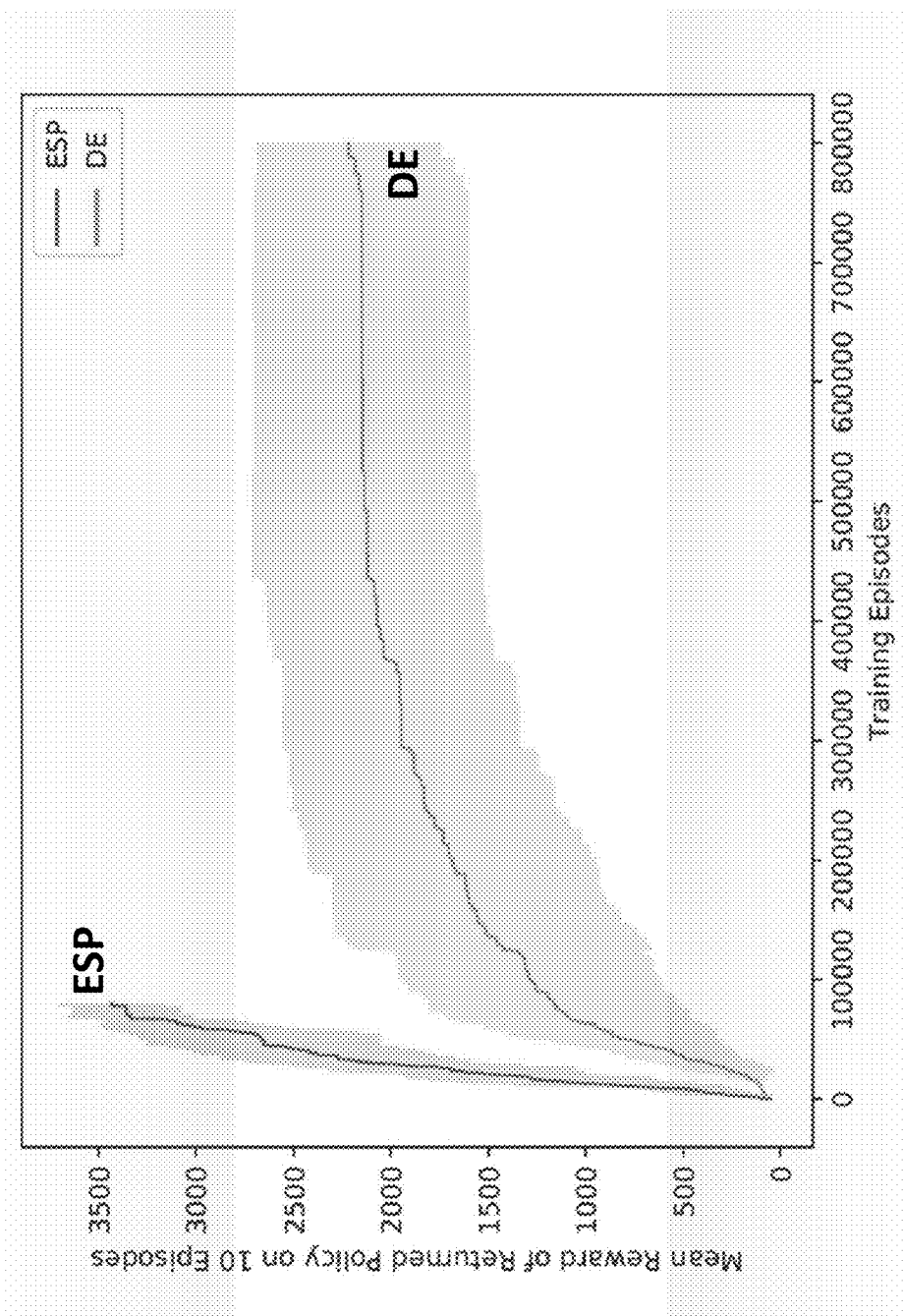
FIG. 6 provides an exemplary visualization of a surrogate approximation of the fitness landscape in accordance with an embodiment herein.

Whenever a surrogate is used to approximate a fitness function, there is a risk that the surrogate introduces false optima and misleads the search. ESP mitigates that risk by alternating between actual domain evaluations and the surrogate. However, the opposite effect is also possible: FIG. 6 shows how the surrogate may form a more regularized version of the fitness than the real world, and thereby make it easier to learn policies that generalize well.

Flappy Bird is a side-scroller game where the player controls a bird, attempting to fly it between columns of pipes without hitting them by performing flapping actions at carefully chosen times. This experiment is based on a PyGame implementation of this game, running at a speed of 30 frames per second. The goal of the game is to finish ten episodes of two minutes, or 3,600 frames each, through random courses of pipes. A reward is given for each frame where the bird does not collide with the boundaries or the pipes; otherwise the episode ends. The score of each candidate is the average reward over the ten episodes.

Both DE and ESP were setup in a similar way as in the preceding sections. DE had a population of 100 candidates, each a neural network with eight inputs (observations), one hidden layer of 128 nodes with tan h activation, and two outputs (actions) with argmax activation. The ESP Predictor was a random forest with 100 estimators, approximating reward values for state-action pairs frame by frame. The state-action pairs were collected with the ten best candidates of each generation running ten episodes on the actual game, for the total of a hundred episodes per generation.

Figure 7:
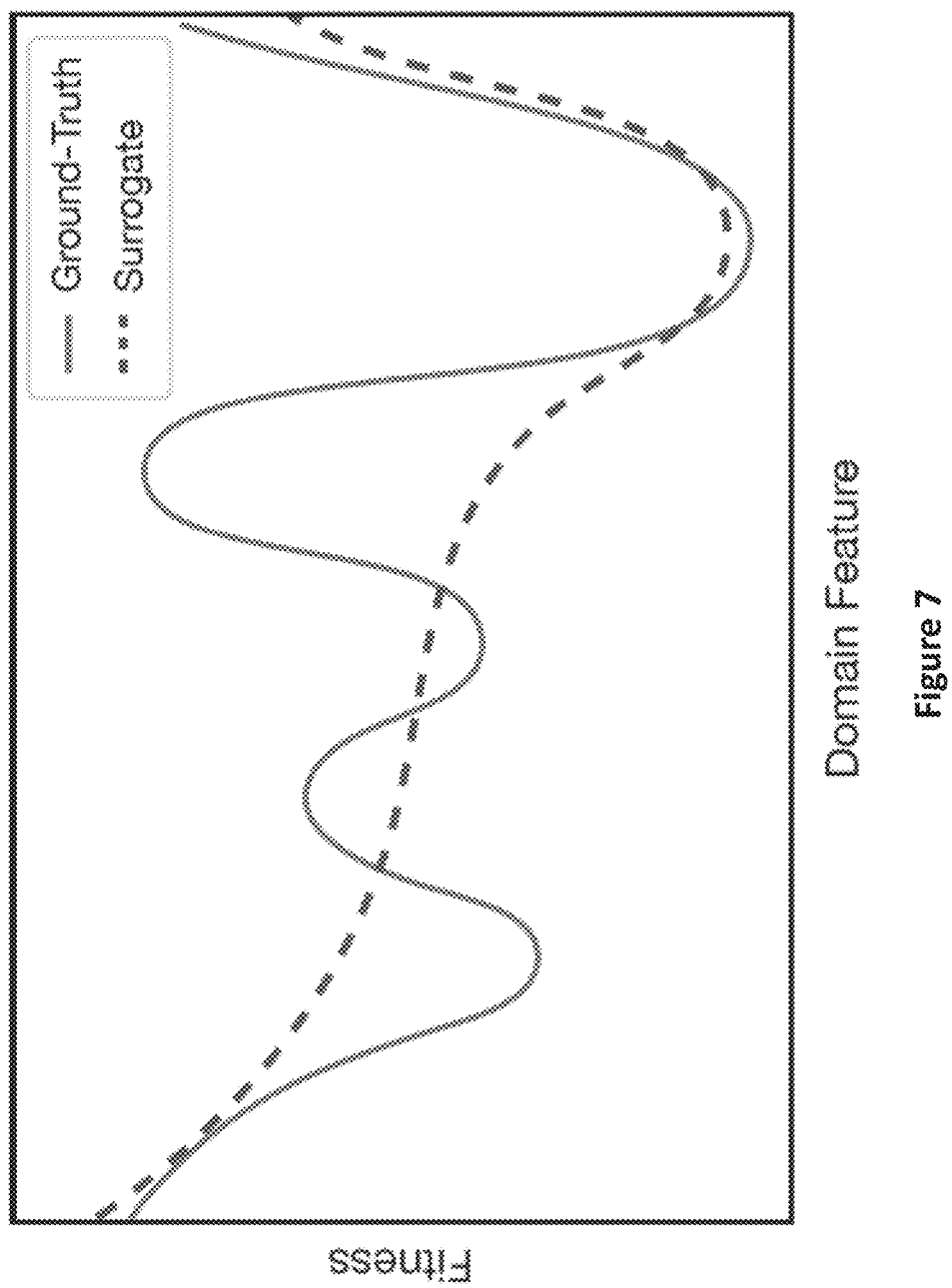
FIG. 7 provides an exemplary visualization of performance of ESP in the Flappy-Bird domain in accordance with an embodiment herein.

FIG. 7 shows how the true performance of the best policy returned by ESP and DE improved during the learning process in the flappy bird domain. The elite candidate that has the best real-world fitness was selected as the best policy so far. In about 80,000 episodes, ESP discovered a policy that solved the task, i.e. was able to guide the bird through the entire course of pipes without hitting any of them. It is interesting that DE converged to a suboptimal policy even though it was run an order of magnitude longer. This result is likely due to the regularization effect illustrated in FIG. 6. Direct evolution overfits to the nonlinear effects in the game, whereas the surrogate helps smooth the search landscape, thereby leading evolution to policies that perform better.

The results disclosed herein show that the ESP approach performs well in sequential decision making tasks like those commonly used as benchmarks for RL. Compared to direct evolution and state-of-the-art RL methods, ESP is highly sample efficient, which is especially important in domains where exploring with the real world is costly. ESP solutions are also reliable and safe, and the complexity of its models can be adjusted depending on the complexity of the data and task. In ESP, only elite agents selected via the surrogate model are evaluated on the real world, significantly improving safety. Second, the quality of the best-recognized policy is unreliable because it has not been sufficiently evaluated during learning. ESP solves this issue by evaluating all elite policies in the real world for multiple episodes. Third, existing RL methods rely heavily on deep neural networks. In contrast, ESP treats the Predictor as a black box, allowing high flexibility in model choices, including simpler models such as random forests that are sufficient in many cases.

These advantages apply to ESP in general, including decision strategies that are not sequential, which suggests that ESP is a good candidate for improving decision making in real-world applications, including those in business, government, education, and healthcare.

Figure 8:
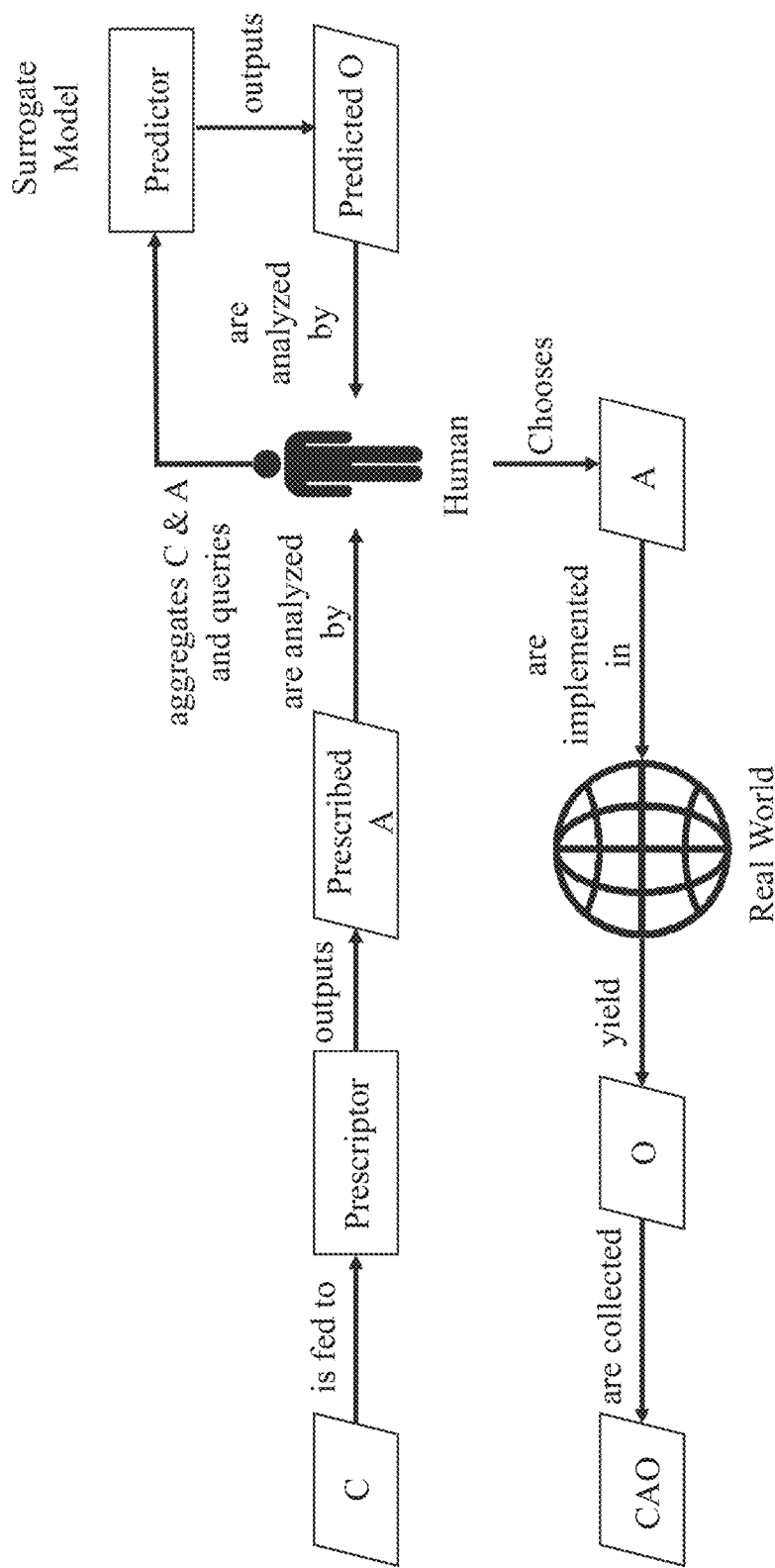
FIG. 8 is an alternate process flow of the ESP algorithm including human intervention in accordance with an embodiment herein.

When ESP is applied to such practical problems, the process outlined above can be extended further in several ways. First, ESP can be most naturally deployed to augment human decision making. The Presciptor's output is thus taken as advice, and the human decision maker can modify the actions before applying them. FIG. 8 illustrates an exemplary process flow wherein human actions are part of the overall process. These actions and their eventual outcomes are still captured and processed in S4 of the ESP process, and thus become part of the learning (FIG. 2c). Second, to support human decision making, an uncertainty estimation model such as RIO can be applied to the Predictor, providing confidence intervals around the out-come O'. Third, the continual new data collection in the outer loop makes it possible to extend ESP to uncertain environments and to dynamic optimization, where the objective function changes over time. By giving higher priority to new examples, the Predictor can be trained to track such changing objectives. Fourth, in some domains, such as those in financial services and healthcare industries that are strongly regulated, it may be necessary to justify the actions explicitly. Rather than evolving a Prescriptor as a neural network, it may be possible to evolve rule-set representations for this role, thus making the decision policy explainable. Such ex-tensions build upon the versatility of the ESP framework, and make it possible to incorporate the demands of real-world applications.

Although the Predictor does not have to be perfect, and its approximate performance can even lead to regularization as was discussed above, it is sometimes the bottleneck in building an application of ESP. In the non-sequential case, the training data may not be sufficiently complete, and in the sequential case, it may be difficult to create episodes that run to successful conclusion early in the training. While the embodiments herein train the Predictor with targets from discounted rewards over time, an alternative approach would be to incrementally extend the time horizon of Predictors by training them iteratively. Such an approach could help resolve conflicts between Q targets, and thereby help in early training. Another approach would be to make the rewards more incremental, or evolve them using reward function search. An yet another approach is to evaluate the quality of the Predictor directly, and adjust sampling from the real world accordingly.

ESP is applicable in multiobjective domains. In many real-world decision-making domains, there are at least two conflicting objectives: performance and cost. As an evolutionary approach, ESP lends itself well to optimizing multiple objectives. The population forms a Pareto front, and multiple Prescriptors can be evolved to represent the different tradeoffs.

ESP is a surrogate-assisted evolutionary optimization method designed specifically for discovering decision strategies in real-world applications. Based on historical data, a surrogate is learned and used to evaluate candidate policies with minimal exploration cost. Extended into sequential decision making, ESP is highly sample efficient, has low variance, and low regret, making the policies reliable and safe. As an unexpected result, the surrogate also regularizes decision making, making it sometimes possible to discover good policies even when direct evolution fails. ESP is therefore a promising approach to improving decision making in many real world applications where historical data is available.

By way of non-limiting examples, the following real-world problems may be addressed using ESP: price and incentive optimization; underwriting; web-site optimization; market-mix optimization; subrogation; fleet management; fraud prevention; human resource management, e.g., hiring, on-boarding, performance, training/development, transitions, wherein outcome objectives such as quality, cost, productivity, time-to-hire, time to performance, post onboarding overhead, performance and retention are weighed; collections, agricultural growth recipe optimization, e.g., computer-controlled hydroponic growth (objectives: light, temperature, water, nutrients), build surrogate model of how plants grow given a recipe, evolve recipe where each new test is used to improve the model, discover size/taste tradeoff, 24-hour light period; optimizing CRISPR guide RNA; refinery optimization; defect detection and the like.

By way of particular example, the underwriting (C, A, O) data sets might include for Contexts, e.g., business class (e.g., office, store), risk category (e.g., high, low), loss history (e.g., by coverage, location, agent, policy type), policy type (new or renewal), total insured value percentage %; for Actions, e.g., underwriter decision (yes, no); coverage (as-is, new); premium range; and for Outcomes, e.g., insured decision (win, loss), loss ratio (quarterly projection), cost.

Further, elements of the ESP embodiments described herein have been applied for optimizing designs of web pages, where a neural network was used to map user descriptions to most effective web-page designs. Exemplary descriptions are found in Miikkulainen et al., Ascend by Evolv: AI-Based Massively Multivariate Conversion Rate Optimization, AI Magazine (2019) and Miikkulainen et al., Sentient ascend: Ai-based massively multivariate conversion rate optimization, In Proceedings of the Thirtieth Innovative Applications of Artificial Intelligence Conference. AAAI (2018), the contents of which are incorporated herein by reference in their entireties. Similarly, elements of the ESP embodiments described herein have been applied to find effective growth recipes for basil through search with a surrogate model trained with outcomes of past recipes. A description is found Johnson et al., "Flavor-Cyber-Agriculture: Optimization of plant metabolites in an open-source control environment through surrogate modeling," PLOS ONE (2019), https://doi.org/10.1371/journal.pone.0213918, the contents of which is incorporated herein by reference.

The embodiments described herein combine elements of strategy search and surrogate modeling into a general ESP approach for decision strategy optimization. The embodiments also extend ESP into decision strategies that consist of sequences of decisions. This extension makes it possible to evaluate ESP against other methods in RL domains. Conversely, ESP is used to formalize RL as surrogate-assisted, population based search. This approach is particularly compelling in domains where real-world evaluations are costly. ESP improves upon traditional RL in several ways: It converges faster given the same number of episodes, indicating better sample-efficiency; it has lower variance for best policy performance, indicating better reliability of delivered solutions; and it has lower regret, indicating lower costs and better safety during training. Surprisingly, optimizing against the surrogate also has a regularization effect: the solutions are sometimes more general and thus perform better than solutions discovered in the domain itself. Further, ESP brings the advantages of population-based search outlined above to RL, i.e. enhanced exploration, multiobjectivity, and scale-up to high-dimensional search spaces.

ESP is a suitable approach to discovering decision strategies when (1) sufficient and consistent historical data of quality measurements on different actions performed in various context is available to bootstrap the surrogate model, (2) deployment allows for reasonable iterations of deploying latest prescriptors and resulting data collection for improving surrogate models, where decision loops currently operated by humans or rigid preprogrammed systems can be replaced.

This application cross-references the following patent applications and publications which are incorporated herein by reference in their entireties and are intended to be part of the present disclosure: U.S. Patent Publication No. 2017/0293849 entitled DISTRIBUTED RULE-BASED PROBABILISTIC TIME-SERIES CLASSIFIER; U.S. Provisional Patent Application No. 62/851,782 entitled Quantifying the Predictive Uncertainty of Neural Networks Via Residual Estimation With I/O Kernel; Qiu, X. et al., Quantifying Point-Prediction Uncertainty in Neural Networks via Residual Estimation with an I/O Kernel, In Proceedings of the Eighth International Conference on Learning Representations (ICLR) (2020); Hodjat, B. et al., PRETSL: Distributed Probabilistic Rule Evolution for Time-Series Classification, In Genetic Programming Theory and Practice XIV. Springer, 139-148 (2018); Meyerson, E. et la., Discovering evolutionary stepping stones through behavior domination, In Proceedings of the Genetic and Evolutionary Computation Conference (GECCO 2017); Miikkulainen, R. et al., Sentient ascend: Ai-based massively multivariate conversion rate optimization. In Proceedings of the Thirtieth Innovative Applications of Artificial Intelligence Conference. AAAI (2018); Miikkulainen et al., Ascend by Evolv: AI-Based Massively Multivariate Conversion Rate Optimization, AI Magazine (2019); Johnson et al., "Flavor-Cyber-Agriculture: Optimization of plant metabolites in an open-source control environment through surrogate modeling," PLOS ONE (2019), https://doi.org/10.1371/journal.pone.0213918; Stanley, K. et al, "Designing neural networks through neuroevolution" Nature Machine Intelligence, Vol. 1, p.24-35 (January 2019).

The invention claimed is:

1. A process for developing an optimized prescriptor model for determining optimal decision policy outcomes comprising:
  building a predictor surrogate model with historical training data to predict an outcome; and
    wherein historical training data trains a predictor model, wherein predictor model $P_d$ is defined Pd (C, A)=O', such that $\Sigma j\ L(Oj, Oj\ ')$ across all dimensions j of O is minimized and function L is a loss function, wherein the loss function (L) is selected from the group consisting of cross-entropy and mean-squared-error,
  feeding the predictor surrogate model in an evolutionary algorithm framework to train a prescriptor model using evolution over multiple generations,
    wherein subsequent generations are evolved based on results of prior generations until an optimized prescriptor model is determined,
    wherein the optimized prescriptor model is determined based on a decision policy,
    wherein the prescriptor model Ps takes a given context as input, and outputs a set of actions: $P_s$ (C)=A, such that $\Sigma i, j\ Oj'$ (Ci, Ai) over all possible contexts i is maximized,
    wherein evolving the prescriptor models over the predetermined number of generations further comprises discovering optimal prescriptor agents in a reinforced learning process in a predetermined domain by;
      i. applying pre-selected prescriptor models in the predetermined domain;
      ii. collecting Q value data for each time step for each pre-selected prescriptor model, wherein a Q value is a reward vector for the step;
      iii. training a predictor model based on data collected in ii.;
      iv. evolving prescriptor models with the trained predictor model as a surrogate over a predetermined number of generations;
      v. repeating i. through iv. until a predetermined convergence metric is met to discover the optimal prescriptor agents in the predetermined domain,
    wherein the pre-selected prescriptor models are neural networks.

2. The process of claim 1, wherein the historical training data includes context information (C), actions (A) performed in an included context, and historical C, A, outcome (O) data sets (C, A, O).

3. The process of claim 1, wherein the predictor surrogate model is a machine learning model trained with supervised methods.

4. The process of claim 3, wherein the predictor surrogate model is a neural network.

5. The process of claim 1, wherein an elite prescriptor model is iteratively selected and applied to a known policy problem to generate new decision policy data in the format (C, A, O) and the new decision policy data (C, A, O) is iteratively supplied as input to the predictor surrogate model.

6. The process of claim 5, wherein the elite prescriptor model is selected based on a fitness evaluation.

7. The process of claim 1, wherein the determination process of the decision policy that optimizes a set of outcomes to solve a known policy problem, comprises:
  i. training a predictor model based on historical training data including context information (C), actions (A)

performed in an included context, and historical C, A, outcome (O) data sets (C, A, O);

ii. evolving prescriptor models with the trained predictor model as a surrogate over a predetermined number of generations;

iii. applying a determined elite evolved prescriptor model at a predetermined interval to a known policy problem to generate new decision policy data in the format (C, A, O);

iv. collecting the new decision policy data (C, A, O) and adding the new decision policy data (C, A, O) to the historical training data;

v. repeating i. through iv. until a predetermined convergence metric is met.

8. The process of claim 7, wherein the predictor model is a machine learning model trained with supervised methods.

9. The process of claim 8, wherein the predictor model is selected from the group consisting of a neural network and a random forest.

10. The process of claim 7, wherein the elite evolved prescriptor model is selected based on a fitness evaluation.

* * * * *